US012458877B2

(12) United States Patent
Hall et al.

(10) Patent No.: US 12,458,877 B2
(45) Date of Patent: Nov. 4, 2025

(54) CHOREOGRAPHED AVATAR MOVEMENT AND CONTROL

(71) Applicant: HiDef Inc., San Diego, CA (US)

(72) Inventors: Jason C. Hall, Woodland Hills, CA (US); Randy Culley, Granite Falls, WA (US)

(73) Assignee: HIDEF ENTERTAINMENT INC., Wilmington, DE (US)

( * ) Notice: Subject to any disclaimer, the term of this patent is extended or adjusted under 35 U.S.C. 154(b) by 847 days.

(21) Appl. No.: 17/529,056

(22) Filed: Nov. 17, 2021

(65) Prior Publication Data

US 2022/0152491 A1 May 19, 2022

Related U.S. Application Data

(60) Provisional application No. 63/115,585, filed on Nov. 18, 2020.

(51) Int. Cl.

| | |
|---|---|
| ***A63F 13/42*** | (2014.01) |
| ***A63F 13/798*** | (2014.01) |
| ***A63F 13/80*** | (2014.01) |

(52) U.S. Cl.

CPC ............ *A63F 13/42* (2014.09); *A63F 13/798* (2014.09); *A63F 13/80* (2014.09); *A63F 2300/5553* (2013.01); *A63F 2300/6607* (2013.01)

(58) Field of Classification Search

None

See application file for complete search history.

(56) References Cited

U.S. PATENT DOCUMENTS 6,758,756 B1 * 7/2004 Horigami ................ A63F 13/54 463/31
7,118,482 B2 * 10/2006 Ishihara .................. A63F 13/58 463/43

(Continued)

FOREIGN PATENT DOCUMENTS

KR 20140124964 A 10/2014
WO WO-2017079731 A1 * 5/2017 ............ A63F 13/45

(Continued)

OTHER PUBLICATIONS

International Search Report And Written Opinion For PCT Patent Application No. PCT/US2021/059732, Mailed on Mar. 24, 2022, 7 pages.

(Continued)

*Primary Examiner* — Xuan M Thai
*Assistant Examiner* — Andrew Bodendorf
(74) *Attorney, Agent, or Firm* — Mintz, Levin, Cohn, Ferris, Glovsky and Popeo, P.C.; F. Jason Far-hadian, Esq.

(57) ABSTRACT

Choreographed avatar movement and control methods, systems and computer program products for the same, the method comprising associating M1 animation segments, for animating an avatar, to M1 corresponding animation cards in a first animation deck virtually implemented over a video game platform; associating M2 animation segments, for animating the avatar, to M2 corresponding animation cards in a second animation deck virtually implemented over the video game platform; and providing N animation decks for selection, the N animation decks comprising the first animation deck and the second animation deck. Transitioning between animation cards in one or more animation decks, wherein the transitioning results in rendering of one or more animation segments associated with selected animation cards as applied to the avatar, such that timing of the transitioning in synchronization with audio being played (Continued)

during the transitioning is a factor in determining a score for the avatar being animated.

18 Claims, 29 Drawing Sheets

(56) References Cited

U.S. PATENT DOCUMENTS

| | | | | |
|---|---|---|---|---|
| 7,528,315 | B2 * | 5/2009 | Goodwin | A63F 13/218 84/611 |
| 7,554,542 | B1 * | 6/2009 | Ferraro | G06T 15/503 345/581 |
| 8,292,736 | B2 * | 10/2012 | Kato | A63F 13/20 463/31 |
| 9,159,151 | B2 * | 10/2015 | Perez | H04N 21/4781 |
| 9,844,730 | B1 * | 12/2017 | Dawson | A63F 13/211 |
| 2001/0004861 | A1 * | 6/2001 | Suzuki | A63F 13/814 84/609 |
| 2002/0019258 | A1 * | 2/2002 | Kim | A63F 13/45 463/36 |
| 2008/0215974 | A1 * | 9/2008 | Harrison | H04L 67/131 715/706 |
| 2010/0113117 | A1 * | 5/2010 | Ku | A63F 13/5375 463/32 |
| 2010/0151948 | A1 * | 6/2010 | Vance | A63F 13/46 463/43 |
| 2010/0267453 | A1 * | 10/2010 | Fujishima | A63B 23/0244 463/43 |
| 2010/0304856 | A1 * | 12/2010 | Coleman | A63F 13/75 463/31 |
| 2012/0292855 | A1 * | 11/2012 | Armstrong | A63F 11/0074 273/293 |
| 2013/0203492 | A1 * | 8/2013 | Yum | A63F 13/44 463/31 |
| 2013/0293538 | A1 * | 11/2013 | Mukai | A63F 13/573 345/419 |
| 2015/0238855 | A1 * | 8/2015 | Uy | A63F 13/24 463/37 |
| 2016/0361631 | A1 * | 12/2016 | Linden | A63F 13/25 |
| 2016/0361642 | A1 * | 12/2016 | Linden | A63F 1/02 |
| 2017/0132828 | A1 * | 5/2017 | Zelenin | A63F 13/63 |
| 2017/0144067 | A1 * | 5/2017 | Murillo | A63F 13/42 |
| 2018/0043259 | A1 * | 2/2018 | Wong | A63F 13/5255 |
| 2018/0311578 | A1 * | 11/2018 | Thomas | A63F 13/95 |
| 2019/0168117 | A1 * | 6/2019 | Miyazaki | A63F 13/20 |
| 2020/0306640 | A1 * | 10/2020 | Kolen | A63F 13/67 |
| 2020/0384346 | A1 * | 12/2020 | Yoshida | A63F 13/69 |
| 2023/0162421 | A1 * | 5/2023 | Tan | G06V 20/41 345/473 |

FOREIGN PATENT DOCUMENTS

| | | | |
|---|---|---|---|
| WO | 2019027483 | A1 | 2/2019 |
| WO | 2019241785 | A1 | 12/2019 |
| WO | 2022109032 | A1 | 5/2022 |

OTHER PUBLICATIONS

International Preliminary Report on Patentability received for PCT Application No. PCT/US2021/059732 mailed on Jun. 1, 2023, 5 pages.

* cited by examiner

*FIG. 25*
Longest Streak: 5
Current Stumble Streak: 101
Longest Stumble Streak: 101
Longest Streak: 3

FIG. 26
THE COLOR FROM THE DJ SET
TRANSFERS TO THE FLOOR

CHOREOGRAPHED AVATAR MOVEMENT AND CONTROL

CROSS-REFERENCE TO RELATED APPLICATIONS

The present application claims priority to and the benefit of the earlier filing date of Provisional Application Ser. No. 63/115,585 filed on Nov. 18, 2020, the content of which is incorporated by reference herein in entirety.

TECHNICAL FIELD

The disclosed subject matter generally relates to controlling movements of an avatar or other characters in a virtual environment and, more particularly, to a mechanism for applying choreographed movements captured in the form of animated segments to create custom animation routines for one or more virtual characters.

BACKGROUND

Video games are among the most popular sources of entertainment. A game typically includes a group of virtual characters, referred to as avatars, who act as the protagonists or antagonists in the game's storyline. Each avatar usually has a limited set of predefined features and a finite number of animated movements are specifically, and often exclusively, prescribed for that avatar. Players of most video games tend to grow fond of certain avatars because of the exclusive functional features (i.e., powers) or visual characteristics (i.e., skin) of that avatar. As a player continues to select the same avatar during a game, the player becomes more skilled in utilizing that avatar's special moves and features.

A player who wishes to be competitive often chooses the avatar with which the player has the most practice and comfort level to have a better chance of winning against a less skilled opponent. While a player may like or prefer the graphical features (e.g., the visual design and skin) of a favorite avatar, the player may like the moves or functional features of another avatar better, and vice versa. Unfortunately, however, a player is generally unable to configure a first avatar with the functional features and characteristics of a second avatar. Further, a player is typically not allowed to add new features to an avatar or easily change or customize the avatar with select moves. In other words, conventionally, the functional and visual features of an avatar are exclusively fixed for that avatar and cannot be customized by the player.

Another disadvantage associated with some popular completion-based video games is that the game developers tend to rely on violence and militant storylines to attract a wide range of players. Typically, such adult features appeal to the lowest most basic common denominators of human character and the general public, but are unsuitable for many players, including young adults and children. The natural, instinctive and primitive attraction of players to violence has led to the perpetual success of some of the most popular video games over the years, such as Street Fighter™ in the 1980s and Mortal Combat™ in the 1990s. Many games in circulation today continue to glorify criminal activity, destruction and death, in games series such as Call of Duty,™ Grand Theft Auto,™ and Fortnite.™

Of course, the gaming marketplace also offers a wide range of non-violent games, including educational or building block games (e.g., The Sims,™ Minecraft,™ Roblox,™ etc.), which are more suitable for children and families. Those who seek an alternative to storylines involving gore and mayhem select the non-violent game genres, but seem to crave a certain level of excitement and challenge that is not present in most non-violent games in the market today. As such, non-violent games are often not as popular or as successful. Improved non-violent game technologies are desired that offer more in terms of adrenaline rush and entertainment in addition to customizable functionality to satisfy the creative aspirations of the player community.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter choreographed avatar movement and control methods and systems are disclosed. The method comprising associating M1 animation segments, for animating an avatar, to M1 corresponding animation cards in a first animation deck virtually implemented over a video game platform; associating M2 animation segments, for animating the avatar, to M2 corresponding animation cards in a second animation deck virtually implemented over the video game platform; and providing N animation decks for selection, the N animation decks comprising the first animation deck and the second animation deck. Transitioning between animation cards in one or more animation decks, wherein the transitioning results in rendering of one or more animation segments associated with selected animation cards as applied to the avatar, such that timing of the transitioning in synchronization with audio being played during the transitioning is a factor in determining a score for the avatar being animated.

In certain embodiments, a computer-implemented system and method is configured for associating five animation segments, for animating an avatar, to five corresponding animation cards in a first animation deck virtually implemented over a video game platform; associating five animation segments, for animating the avatar, to five corresponding animation cards in a second animation deck virtually implemented over the video game platform; providing four animation decks for selection, the four animation decks comprising the first animation deck, the second animation deck, a third animation deck, and a fourth animation deck. In response to a first user interaction with a first primary input element, a first animation card in the first animation deck is selected. In response to a second user interaction with a first secondary input element, a second animation card in the first animation deck is selected. In response to a third user interaction with a second primary input element, a first animation card in the second animation deck is selected; and in response to a fourth user interaction with the first secondary input element, a second animation card in the second animation deck is selected. The method may further comprise transitioning between animation cards in one or more animation decks. The transitioning results in rendering of one or more animation segments associated with selected animation cards as applied to the avatar.

In one aspect, a computer-implemented system for controlling animated renderings via a physical display device is provided. The system comprises one or more processors for executing logic code causing the one or more processors to perform operations comprising associating M1 animation segments, for animating an avatar, to M1 corresponding animation cards in a first animation deck virtually implemented over a video game platform; associating M2 animation segments, for animating the avatar, to M2 corresponding animation cards in a second animation deck virtually implemented over the video game platform; providing N animation decks for selection, the N animation decks comprising the first animation deck and the second animation deck. In response to a first single user interaction with a first primary input element on a controller device, a first animation card in the first animation deck is selected. In response to a second single user interaction with a first secondary input element on the controller device, a second animation card in the first animation deck is selected. In response to a third single user interaction with a second primary input element on the controller device, a first animation card in the second animation deck is selected. The system may transition between animation cards in one or more animation decks. The transitioning results in rendering of one or more animation segments associated with selected animation cards as applied to the avatar, such that timing of the transitioning in synchronization with audio being played during the transitioning is a factor in determining a score for the avatar being animated in response to the transitioning.

The first primary input element is a first user interface button on the controller device and the second primary input element is a second user interface button on the controller device. The first user interface button is independently engageable from the second user interface button. The secondary input element comprises one or more input elements associated with one or more states. The one or more states includes a neutral state associated with the first animation card in the first animation deck. The one or more states includes a directional state associated with the second animation card in the first animation deck. The secondary input element comprises a plurality of input elements associated with a plurality of states.

In some embodiments, the input elements include a neutral state input element associated with the first animation card in the first animation deck, and at least one directional state input element associated with the second animation card in the first animation deck. The secondary input element may be a directional input pad having a plurality of directional input elements and a neutral state input element, the neutral state input element being triggered by default when the first primary input element is active, thereby rendering a first animation segment as applied to the avatar without user interaction with any secondary input element. The secondary input element may be a directional input pad having a plurality of directional input elements and a neutral state input element, the plurality of directional input elements being assigned to at least one or more of an upward direction, a downward direction, a leftward direction, and a rightward direction respectively, at least one of the plurality of directional input elements being triggered in combination with the first primary input element for rendering a first animation segment as applied to the avatar requiring user interaction with both the first primary input element and at least one secondary input element. The animation segments may depict one or more segments from a dance routine choreographed based on timed sequences that are synchronizeable with the beat or cadence of the audio being played during the transitioning.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Figure 1:
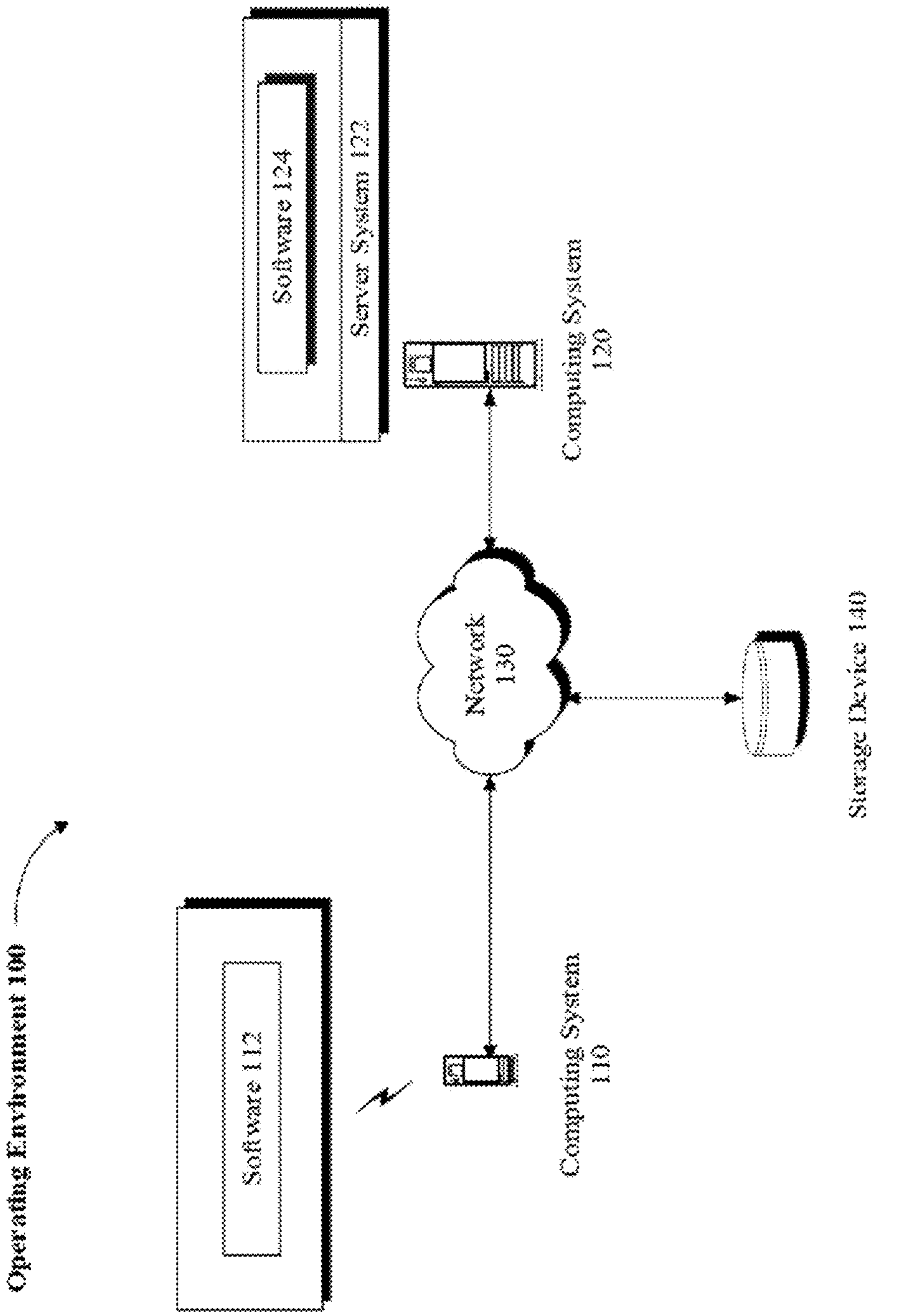
FIG. 1 illustrates an example operating environment, implemented in accordance with one or more embodiments, in which one or more video games may be executed over an off-line or online gaming platform.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Implementations of the current subject matter may include methods and systems configured for executing or playing a video game on a video game platform or console. In certain aspects, a player (e.g., a user, a consumer, a video game player, etc.) may interact with a video game controller or other machine (e.g., a smart phone, a game console, a general computer, etc.) to select a choreographed series of movements for a virtual character (i.e., an avatar). To accomplish this, the player may choose from a set of predefined moves (e.g., dance moves). These moves may be associated with one or more of a particular dance genre (e.g., hip-hop, breakdance, etc.), popular dance moves (e.g., the Moonwalk, the Floss, etc.), famous people or characters (e.g., John Travolta, He-Man, Brittney Spears, etc.), or popular movies and videos (e.g., Flash Dance, Thriller, etc.).

For the purpose of example, certain aspects of the disclosed subject matter herein are characterized, described, defined or associated with animation moves related to dancing, dance moves, or participation in a dance contest. It is noteworthy, however, that the functionalities, features and structural elements disclosed herein may be also applicable, with or without some modification, to other forms of activity and movement, including but not limited to activities involving any type of sport or any type of move that can be choreographed. Other example embodiments may be applicable to or include skateboard moves, surfing moves, basketball dribbling or dunk moves, and any activity involving tricks using a board or a ball, including but not limited to snowboarding, snow skiing, water skiing, soccer dribbling or shooting. In some aspects, the subject matter may relate to a magician performing magic moves or spells for conjuring certain results, for example.

In some implementations, and as provided in further detail herein and below, predefined moves may be incorporated into a virtual set of choreographed and animated move segments. A move segment may be visually represented by a virtual animation card that can be selected by a player. This implementation of individual move segments into selectable animation cards enables the player to put together a preferred group of moves by selecting a series of animation cards that can be combined to animate a selected avatar. Once the animation cards are assigned to the avatar, the player can select between the different animation cards in an animation deck to accordingly control the movements of the avatar.

Depending on implementation, the player may enter into a staged area in the video game for the purpose of practicing the moves alone or with a group of other players. In the staged area, the player may be able to select the music, background, skin and various animation cards for an avatar. The player may have (or depending on skill level be given) the option to participate in a contest to compete against other players, either one-on-one or in a group. By way of choosing between various animation cards and timely activating the different moves during play, preferably in tune with the rhythm, beat, or cadence of the music being played in the background, a player may control the movements of an avatar by selecting between the predefined moves captured in an animation card and intuitively transition between the selected moves by way of deterministically switching between animation cards.

As provided in further detail herein, in certain aspects, the moves are automatically morphed as the selected avatar transitions from one animation card to another as the player controls the movements of the avatar and performs movement combinations in animation cards assigned to the avatar. Depending on implementation, a selected avatar may be able to perform all available moves, or all possible moves available in a particular animation deck assigned to or selected for the avatar, but not any other moves that are not included in the selected animation deck. Further, a player may not be able to, for some avatars, select, assign, purchase or obtain certain animation cards. Thus, in some embodiments, an avatar may be either more capable, or possibly less capable of performing some moves, unless certain features or levels are unlocked or purchased by a player so that a desired animation card can be added to the animation deck for the particular avatar.

For example, a series of moves may be exclusively available for purchase with a particular avatar or skin. Or, a particular avatar may be able to acquire additional or exclusive moves as the player unlocks more advanced levels using the particular avatar or skin. By way of a non-limiting example, if a player selects a Michael Jackson avatar, that avatar may be compatible with moves in the animation card for the Moonwalk. A player may be also able to separately acquire other animation cards, including a card that includes the moves in the Thriller music video, for example, with which the Michael Jackson avatar is also compatible. In contrast, if the player acquires a third animation card that includes the Floss move, the Michael Jackson avatar may not be compatible with the Floss animation card and the Floss animation card cannot be assigned to the Michael Jackson avatar.

It is noteworthy that the above limitations may not be incorporated into certain embodiments, or may be selectively incorporated into one or more embodiments, or may be effective only in association with certain avatars. For example, the player may be able to obtain an avatar (e.g., a Superman or Britney Spears skin) that is compatible with all animation cards, or most animation cards. As such, some avatars may have no limitations, or very few limitations. Conversely, certain avatars may be configured to operate with a limited set of moves, but may include special moves or traits that can throw off a more formidable avatar. For example, a Pee-Wee Herman skin may have a special feature (e.g., a kryptonite tie) that would weaken or limit certain movements of a more capable avatar (e.g., a Superman skin) during a contest. Accordingly, some avatars may have, or may be able to obtain, a secret weapon (or defense) that poses a challenge to (or makes them immune to) certain other avatars.

In certain embodiments, a player may competitively play against other players for prizes. For example, depending on skill level or other criteria, players may be matched, scheduled and moved up in an eSports forum in which a plurality of contestants participate to win cash or prizes. The participants may be randomly matched in certain scenarios or may require to participate in qualifying rounds before being matched.

In one or more embodiments, a scoring algorithm may be utilized that invokes an artificial intelligence (AI) self-learning model to calculate a score for a player's performance based on the reaction of the audience to the avatar's moves, optionally, in combination with certain other factors. For example, in some embodiments, responses (e.g., "likes") submitted by members of a viewing audience who rate the avatar's moves may be measured. The scoring algorithm may be configured to assign specific scores to a move or a series of moves performed by an avatar. In certain embodiments, a hybrid approach may be used based on a combination of the audience's reaction and the scoring algorithm to maintain an equitable point system or to avoid cheating.

By way of example, in a scenario where the audience is unfairly "liking" or voting for a player that is not as skilled as another player, the algorithm may detect an outlier event and make a proper correction to the score. For instance, an outlier event may be detected, if a high score is earned by a player in response to the audience voting for a simple move, or a series of simple moves. As such, while the algorithm is configured to reward a player based on the audience's reaction, skill or other factors (e.g., special moves, avatar skin, etc.), the algorithm may also able to detect and block cheaters and disable inappropriate favoritism. The audience may be charged a fee for attending a contest, in certain embodiments, and may be excluded from attendance for inappropriate behavior.

Referring to FIG. 1, an example operating environment 100 (e.g., a game platform) is illustrated in which a computing system 110 may be used by a player to interact with software 112 (e.g., a video game) being executed on computing system 110. The computing system 110 may be a game console, a general purpose computer, a handheld mobile device (e.g., a smart phone), a tablet (e.g., an Apple iPad®), or other communication capable computing device that can be configured or used for playing a video game. Software 112 may be a web browser, a dedicated app or other type of software application running either fully or partially on computing system 110 configured for executing a game or providing a gaming environment.

Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 (e.g., an on-line game server) may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. In certain aspects, the game platform may be implemented over a distributed electronic ledger, such as a blockchain. Execution, implementation or instantiation of software 124, or the related features and components (e.g., software objects), over server system 122 may also define a special purpose machine that provides remotely situated client systems, such as computing system 110 or software 112, with access to a variety of data and services as provided below.

In accordance with one or more implementations, the provided services by the special purpose machine or software 124 may include providing a player, using computing system 110 or software 112, with the ability to play a video game such as that disclosed herein. In certain embodiments, the video game may be implemented as software 112 that is either locally supported for execution on computing system 110, or at least partially communicates with computing system 120 and software 124 to provide the player with the capability to play the video game on-line and in connection with a multiplayer environment, such as a massively multiplayer online gaming (MMOG) environment, in which a player may play against, compete, or join forces with other online players.

In certain implementations, a development server may be built using a plurality of microservices deployed in an event-driven computing architecture in which microservices exchange information through the production and consumption of events. An event-driven system enables messages to be ingested into the event-driven ecosystem and then broadcasted to interested microservices. The microservices may be provisioned over multiple servers (e.g., web servers) having cross dependencies on one another. In some embodiments, a microservice manages its own state so that it can run independent of other microservices. In order to communicate a change in state, a microservice may publish an event, if the microservice updates data that is shared or used by other microservices.

As such, a microservice is given the option to subscribe to events published by other microservices in order to receive notices about data updates and accordingly update related data or functionality. In some aspects, data updates at the microservice level are performed without respect to audio streaming but in respect to time and game design data. Audio data may be used to generate a part of the game design data but audio play back on the server may not be needed. This approach can help reduce overhead and costs by decoupling the components of an application which allows for a better and more efficient scale, independence across the network, and flexibility with respect to computing resources. For example, a small subset of resources rather than all resources may be loaded using the above approach allowing for easier and less frequent updates.

Figure 2:
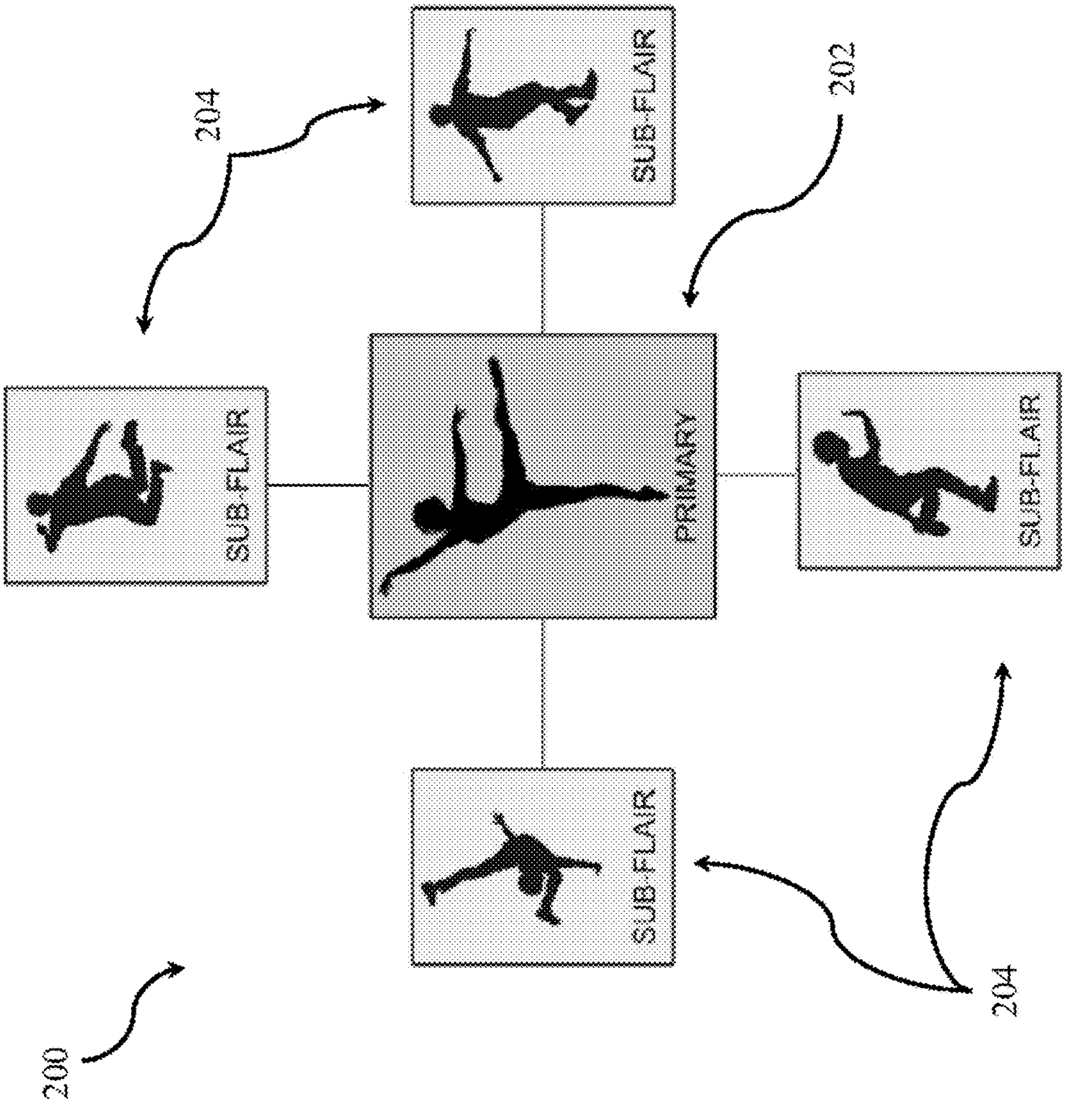
FIG. 2 is a representation of example choreographed avatar movements that can be associated with or grouped into an animated set (e.g., an animation deck including one or more animation cards), in accordance with one or more embodiments.

Referring to both FIGS. 1 and 2, software 112 or software 124 may be configured to implement a control mechanism where choreographed moves or animations are divided into animation segments (e.g., animation cards) that can be associated or chained together to create a custom choreographed move animation for an avatar. A player may be able to execute the animation segments in a dynamically controllable fashion and order to perform a series of moves starting with the movements captured in a primary animation card 202, for example, and transitioning to selectable secondary animation cards 204. The player may transition between animation cards by way of interacting with a user interface component of computing system 110, which provide the player with the freedom to manipulate the movements of a selected avatar in an intuitive but precise and controllable manner.

Referring to FIG. 2, examples of choreographed avatar movements represented in the form of animation cards are illustrated. As shown, a movement or a series of moves may be associated with a virtual animation card (or a virtual deck of animation cards) representing an animated set of movements for an avatar. For example, a deck of animation cards 200 may include multiple animation cards including, for example, a primary animation card 202 (i.e., a flair) and multiple secondary animation cards 204 (i.e., sub-flairs). The primary animation card 202 may be associated with one or more secondary animation cards 204 in a hierarchical arrangement such that a player may transition from the primary animation card 202 to one of a plurality of secondary animation cards 204 with a single interaction (e.g., pressing a single directional button).

It is noteworthy that the illustration in FIG. 2 is by way of example. In certain embodiments, more than one primary animation card may be in an animation deck 200 and any number of secondary animation cards 204 (0 to N) may be associated with the primary animation card 202. Further, the associations between the individual animation cards may be single- or multi-layered. In a single-layered arrangement, the animation cards may be associated in series. In a multi-layered arrangement, a hierarchical structure (e.g., a B-tree, or other multilevel data structure) may be used to implement the relationship between multiple animation cards. Implementing more levels of hierarchy may make the game more challenging and provide additional player options.

For example, in some embodiments, the animation deck 200 may comprise a set of standard animation cards connected in an ordered series (or in an arbitrary order). In such an embodiment, a player may have only one or two options for transitioning from a selected animation card to the next card. In some other embodiments, instead of having a two-level hierarchical structure such as that shown in FIG. 2, a three-level or multi-level hierarchical structure may be implemented. In such embodiments, a player may have the option of transitioning through multiple layers of animation cards. Further, as noted earlier, instead of having four secondary animation cards 204, six (or more) secondary animation cards may be provided, depending on how the mapping between the animation cards and the user interface components is implemented.

Regardless of the level of hierarchy or the number of primary or non-primary animation cards in an animation deck 200, or corresponding mappings between controller buttons and animation cards, the system may be implemented so that a player can cause an avatar transition from one animation card or a series of movements to another by way of interacting with one or more user interface components of computing system 110. A user interface component may be a game controller 300, such as that shown in FIG. 3, a keyboard or a keypad (not shown), or a virtualized game controller visually displayable on a screen, which may be controllable via touch on a touch screen or a touchpad (not shown), or a combination thereof.

As such, animation segments for moves, which are assigned to a set of animation cards in an animation deck 200, provide a player with the option of controlling a series of moves for a selected avatar. Advantageously, the series of movements are configured such that a player may intuitively control transitioning between different movements in the animated set for a selected avatar. By way of a non-limiting example, various options and scenarios for implementing control over an avatar movements and possible transitions between moves is provided in further detail herein and below with reference to control components and instruments on an example game controller 300.

Figure 3:
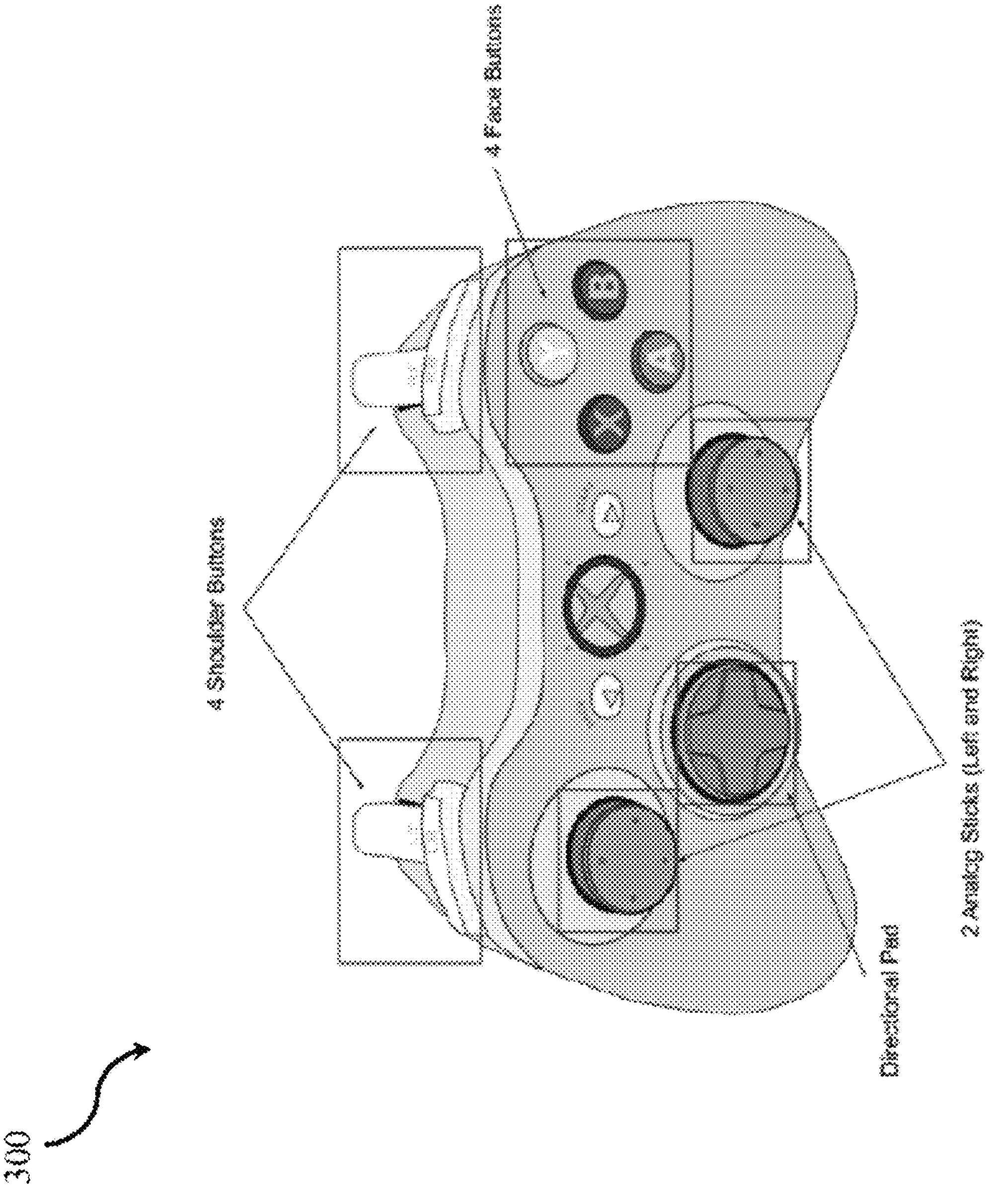
FIG. 3 is an example controller utilized for controlling one or more avatars and the transition between different movements, in accordance with one embodiment.

Referring to FIG. 3, an example game controller 300 may include a plurality of control instruments such as one or more buttons (e.g., four face buttons, four shoulder buttons) and directional pads and joysticks (e.g., two analog sticks) that may be utilized by a player for controlling an avatar's movements and the transitions between different movements. In accordance with one example embodiment, a primary animation card 202 may be associated with a default animation segment that will animate a selected avatar when the controller's control components or instruments are in a first state. The first state may be a default or neutral state, for example, defined by the player holding one of the controller buttons when a directional pad (or a joystick or a series of direction buttons or keys) is in a neutral position. Depending on implementation, movement to a secondary animation card 204 may be accomplished by way of the player interacting with a directional key on the directional pad to choose a direction (e.g., Up, Down, Left, Right).

Virtual alternatives or equivalents to a physical game controller 300 such as GUI buttons or joy sticks rendered on a touchscreen, or alternate reality (AR) or virtual reality (VR) environments, are also possible and are within the scope of this disclosure. It is noteworthy that in certain embodiments, one or more components or instruments of the game controller may be embedded or displayed onto a display screen (or AR/VR goggles or glasses) on which the game environment is visually rendered. In other words, portions of the display screen may be assigned to interactive virtual control instruments that would function in the same or similar manner to the physical control instruments noted above with respect to the game controller 300.

Depending on implementation, the buttons may be virtual GUI buttons on which a player can tap using fingers on one or both hands or a virtual wand. Similarly, the player may control a virtual GUI joystick using one or more fingers, a virtual controller, etc. The joystick may be also implemented on the screen with functional features that would allow a player to drag the virtual joystick in multiple directions to switch between animation cards or otherwise manipulate the avatar movements.

In certain embodiments, instead or in addition to the physical and virtual interfaces mentioned above, a scanning system or camera may be utilized to receive input from a player based on a player's movement of his body parts (e.g., hand, arms, legs, hips, head, fingers, etc.) and translate such movements into control commands that would allow the player to animate a selected avatar (e.g., according to the captured bodily movements or a video), such that the avatar moves would mimic the players captured bodily movements. The captured bodily movements may be also used as separate commands to select and transition between the various animation cards.

Figure 4:
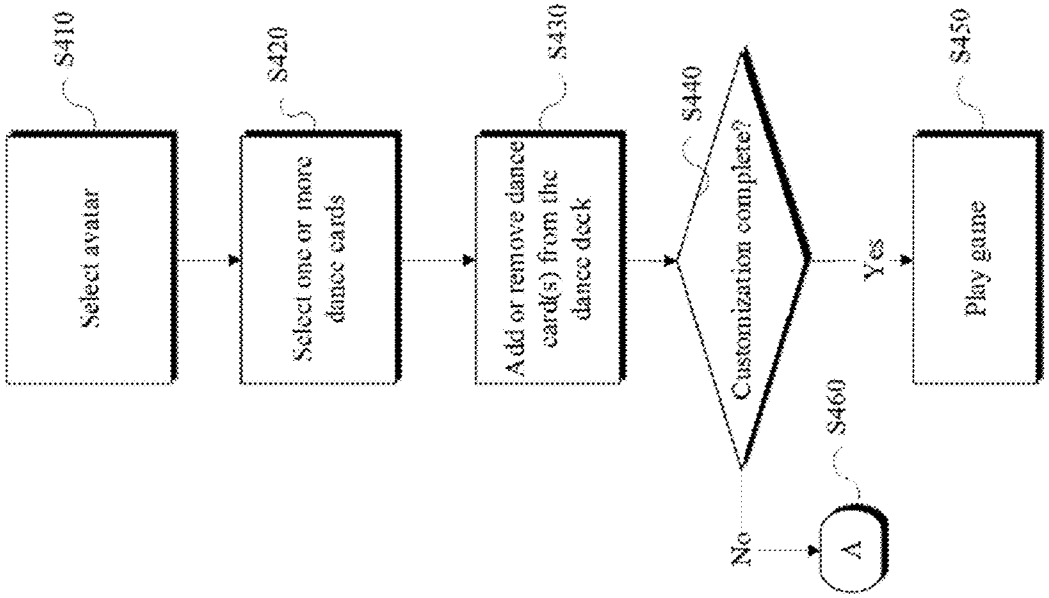
FIG. 4 illustrates a flow diagram for a method of customizing or assigning a set of moves to an avatar, in accordance with one or more embodiments.

Referring to FIGS. 3 and 4, to play a game, a player may interact with the game controller 300 buttons (or other physical or virtual control instruments) to select an avatar from a plurality of avatar options presented to the player in a selectable graphical user interface menu. The menu options may be implemented in a way that allow the player scroll through the options and view a visual representation of the avatar's skin and optionally functional characteristics (e.g., any animation cards or animation decks assigned to that skin). Upon viewing the menu options, a player may select an avatar from the plurality of avatar options (S410). The player may be given the option, in some embodiments, to also select one or more animation cards (or a set of animation cards implemented in the form of an animation deck) in association with a selected avatar.

In some implementations, an animation card or an animation deck associated with, or available for, the selected avatar may be offered for selection through an in-game selectable menu or store, or from a digital forum or on-line store (e.g., PlayStation Store,™ Apple App Store,™ the Google Play Store,™ etc.). A player may select one or more animation cards from the provided menu (S420). The selected animation cards may be either immediately assigned to a chosen avatar, or the player may be given the option to assign one or more animation cards to an avatar from among a plurality of avatars that are either available to the player or the player may have already in his or her arsenal. In certain aspects, an animation deck may be already assigned to an avatar when the avatar is selected. The player may also be given the option to add or remove one or more animation cards from an animation deck assigned to an avatar (S430).

In some example embodiments, an animation deck may be limited to a predefined number of animation cards (e.g., one primary animation card and four secondary animation cards as shown in FIG. 2). By adding or removing animation cards from the move deck assigned to an avatar, a player may customize the avatar's functional capabilities in anticipation of participating in a competition against one or more opponents or participants in a contest. The addition or removal of the animation cards may be based on player strategy on how to win against a particular opponent or within a certain setting or background. For example, the player may be provided with information about an opponent's avatar characteristics and choose a set of animation cards for his own avatar to be able to prevail over the opponent's avatar in a competition.

Once the player has selected the animation cards, deemed appropriate for the player's purposes for example, and the customization is complete (S440), then the player may continue to a next stage where the player may start or play a game (S450). As noted in further detail herein, playing a game may involve a practice stage, a contest or competition stage, an editing stage, or other stages in which the player may adjust, control, create or customize movements and features for an avatar. If the customization is not complete, the system may move to an alternate state (S460). The alternate state may include providing a notification or player instructions, reporting an error, or looping back to a state in which the player may continue to select an avatar or continue the customization process.

Depending on implementation, if the player decides to enter a practice stage, the player may be given the option to learn or practice different moves as the player chooses from among different settings, backgrounds and music options before moving to the competition stage. The competition stage may involve one or more rounds. In an example scenario, there may be three rounds total. The location or setting of the first round may be selected by one or more of the contestants. For example, a first contestant may be skilled in dance moves in the hip-hop genre and may select a location, background or setting (including music or audience) that provides her with the best opportunity to win. In some embodiments, the second round in a competition stage may be selected by a second contestant that was participating in the first round, for example.

The second contestant may be given the option to choose a virtual location, background or setting that is most conducive to his style and capabilities for winning the contest in the second round. The third round may be selected by the winner (or the loser) of the second round, for example, if the contestants are tied. Other implementations are possible depending on the nature of the contest and the number of participants in each round. For example, a contestant may be able to (or be prevented from) switching to a different avatar, or shuffling to different animation cards, in between rounds, or while the game is in progress during a round. Regardless, a goal of a contestant may be to choose the avatar and a deck of animation cards that maximize the chances of winning against other contestants according to the contestants' level of skill and the strength or weaknesses of the chosen avatars within a defined competition environment.

Referring to FIGS. 5 through 8, in certain embodiments, control mechanisms such as a game controller's buttons and joysticks or virtual equivalents on a touch screen (e.g., see FIGS. 9C, 9D, 9E, and 11 through 26) may be mapped to certain moves to allow a player to control an avatar's animation and transition between different moves. As provided earlier, the moves may be dynamically assigned to a selected avatar based on a player choosing a set of animation cards for the selected avatar. Depending on implementation, control instruments such as a joystick component or directional buttons of a game controller (whether physical or virtual) may be configured to correspond to a neutral position and multiple directional positions. For example, a cross-shaped directional map (e.g., see FIG. 7) may be referenced so that the related game controller's user interface components positioning or movements are mapped to five values (Neutral, Up, Down, Left and Right), where each value is associated with an animation card.

Figure 5:
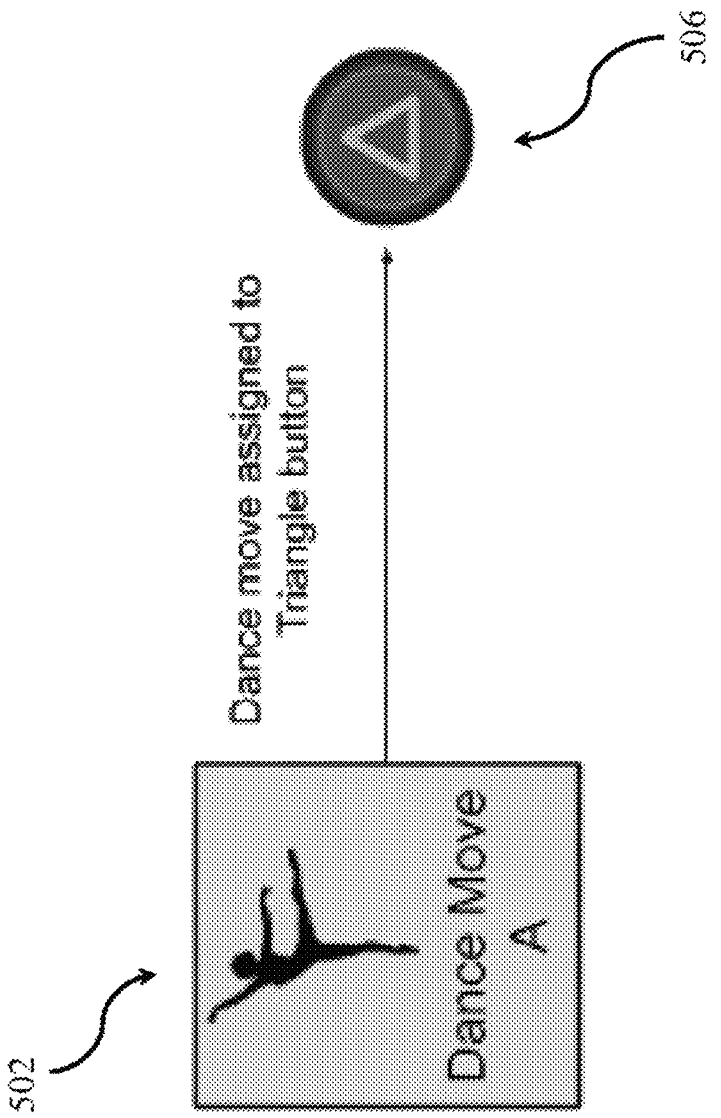
FIG. 5 illustrates an example virtual animation card representing a series of moves, which may be assigned to one or more user interfaces or control instruments of a controller, in accordance with one or more embodiments.
Figure 6A:
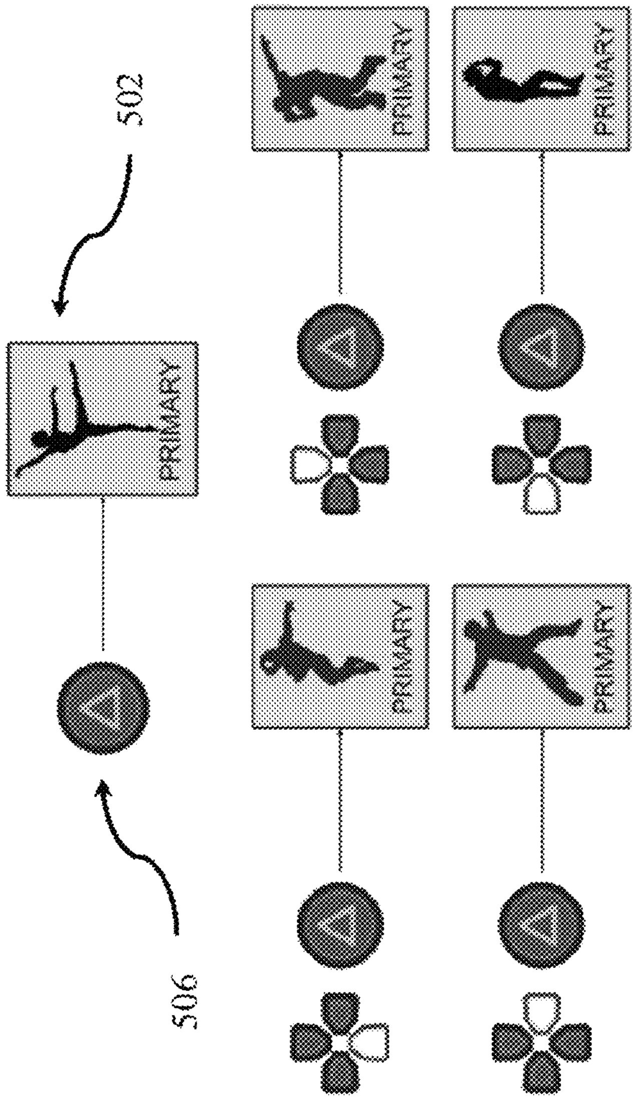
FIGS. 6A and 6B are examples of a combination of user interfaces or control components and instruments that may be mapped to a series of virtual animation cards to dynamically customized dances for a selected avatar.

Depending on the number of buttons on the controller, one or more buttons (or a combination of buttons) may be mapped to additional values and thus additional animation cards (or animation decks). For example, button combinations on the controller may be configured to select between five animation cards. In the example of FIG. 5, holding down the triangle button 506 and having the joystick (or directional button selection) in the neutral position may result in the selection of the primary animation card 502. Referring to FIGS. 5 through 7, by way of player holding the designated button 506 down and moving the joystick in up, down, left or right positions (or choosing from the appropriate directional buttons), a player may controllably transition between the other four corresponding secondary animation cards.

In an example embodiment, one objective of the player may be to transition between the animation cards in sequence with proper timing. That is, the player may be able to score higher points by properly timing the transition between the animation cards according to the rhythm and beat of the music being played during a performance. The more accurate the timing is, the higher is the score for performing a corresponding move or move segment. In certain implementations, a visual guide (e.g., a scrolling time bar or a rhythm indicator) may be displayed to provide the player with feedback about the synchronization between the moves performed by the avatar and the musical beat to which the avatar is dancing. Additional feedback may be provided by suggesting to the player that the transition between the moves was timely or untimely.

Accordingly, in certain embodiments, to assist the player with achieving a better score, interactive or responsive cues are provided as feedback. These cues may be audible, visual, or haptic in nature. In one aspect, a graphical user interface (GUI) is provided in which a visual element (e.g., a vertical or a horizontal bar) allows the player to follow the beat of the music and synchronize the timing of the animated movement while the music is being played. For example, the player viewing visual elements (e.g., progression markers) on a status bar is able to receive feedback as to when to switch from one animation card to another, as a moving indicator moving on the status bar passes each visual element.

One measure of success for gaining a better score may be whether the player manages to switch, for example, from a first animation card to a second animation card in a timely manner (e.g., in accordance to the beat or cadence of the music being played). Progression markers on the status bar may provide clues as to when the proper time has come to switch between animation cards. For example, a horizontal status bar across a lower portion of the screen may be implemented to include short vertical progression markers such that the position of the markers corresponds to the beat of the music. See, for example, FIGS. 1-19.

A player that can synchronize the avatar's movements (e.g., switch between animation cards) precisely at the progression markers would receive points according to a measurement of how precise the moves are timed or synchronized to the progression markers, which in effect represent the beat of the music. Accordingly, paying attention to the beat of the music in combination with the visual feedback provided by the progression markers on the status bar provides a player with better cues on when to make a transition between animation cards and how to score additional points.

In some implementations, a fixed or dynamic scoring or point system may be used to calculate a score for a player or an avatar selected by the player. The point system may be based on, for example, the complexity of the moves performed, proper timing between the moves (e.g., responsiveness or synchronization with the rhythm of music being played during a game period), or both. A player may be able to score more points, for example, if the avatar can progressively or repetitively perform a series of predetermined moves one after another within a time threshold (e.g., perform a chain of particular moves by selecting two or more animation cards in sequence that can be linked together). In this manner, a player that can perform a series of predefined moves quickly and flawlessly may be able to obtain bonus points or be provided with bonus features, such as additional health, adrenalin, additional or special animation cards, or a chance to win extra prizes.

As such, in addition or instead of points, the player may be rewarded with other special features. One example special feature may be implemented in form of hype or adrenalin and accumulated separately from points. As adrenaline accumulates, the avatar may be able to perform additional moves or receive higher scores for certain moves. In some embodiments, accumulation of adrenalin beyond a certain threshold may also enhance certain avatar features. For example, adrenaline may be visually manifested as a halo or an aura around the avatar and increase in intensity as the amount of adrenaline collected passes one or more thresholds. See, for example, FIGS. 12 and 13.

Other possible visual manifestations may include adjustments in lighting, colors, shapes or other features associated with the visual appearance or likeness of the avatar. Some other aspects may include graphically tracing the movements of the avatar's body parts (e.g., hands, arms, legs, feet, head, face, tongue, etc.) as the avatar engages, performs, completes, or transitions between moves. See, for example, FIG. 13 through 15.

In some embodiments, the visual feedback may include a sound or a popup window, text, or image that indicates how well the player is performing in switching between animation cards. For example, a pop up may indicate "perfect," "good," or "too late" depending on how well the player has synchronized the movements of the avatar to the cadence of music being played. See, for example, FIGS. 16-19. Instead or in addition to visual feedback, audible, haptic and other types of feedback may be also implemented to assist a player with timely transitions between animation cards.

Players who participate in a contest or battle (e.g., dance battle) may have the option to play friendly games that simply identify a winner at the end of the contest, which may include one or more rounds. In accordance with some aspects, a player may specifically challenge another player. Optionally, during a competition between a first player and a second player, while the first player's avatar is engaged in the contest (e.g., a first avatar is dancing as controlled by the first player), the second player may invoke a special feature (e.g., a clash, a challenge, etc.) which would allow the second player to temporarily interrupt the first player and challenge the first player to a duel.

In some embodiments, the first player may need to accept the duel in order for the second player to engage and for the duel (e.g., a short clash) to be activated. When a duel is activated or accepted, the first player and the second player will take turns to perform a series of moves that may be specifically scored based on input from a present audience. The player that wins the duel may get extra points that go towards winning the contest, or alternatively may result in damage to the opponent in one or more ways, such as for example a reduction in points or hype or health, etc.

Referring back to FIGS. 6A and 6B, depending on the number of buttons and directional options available on a controller, a player may be able to control transitioning between a number of animation cards with by pressing a minimum number of buttons. In the example of FIG. 6A, the player may control movements of the avatar by transitioning between five animation decks, for example, by pressing a primary button (e.g., a triangle button or another designated primary button) one or more times. As shown in FIG. 6A, pressing the triangle button once may select a first animation deck having a plurality of animation cards for a first animation genre (e.g., ballet). Pressing the triangle button twice may select a second animation deck having a plurality of animation cards for a second movement genre (e.g., modern dance), and so on. As such, a player may cycle through a number of different animation decks by pressing a designated primary button several times.

Figure 6B:
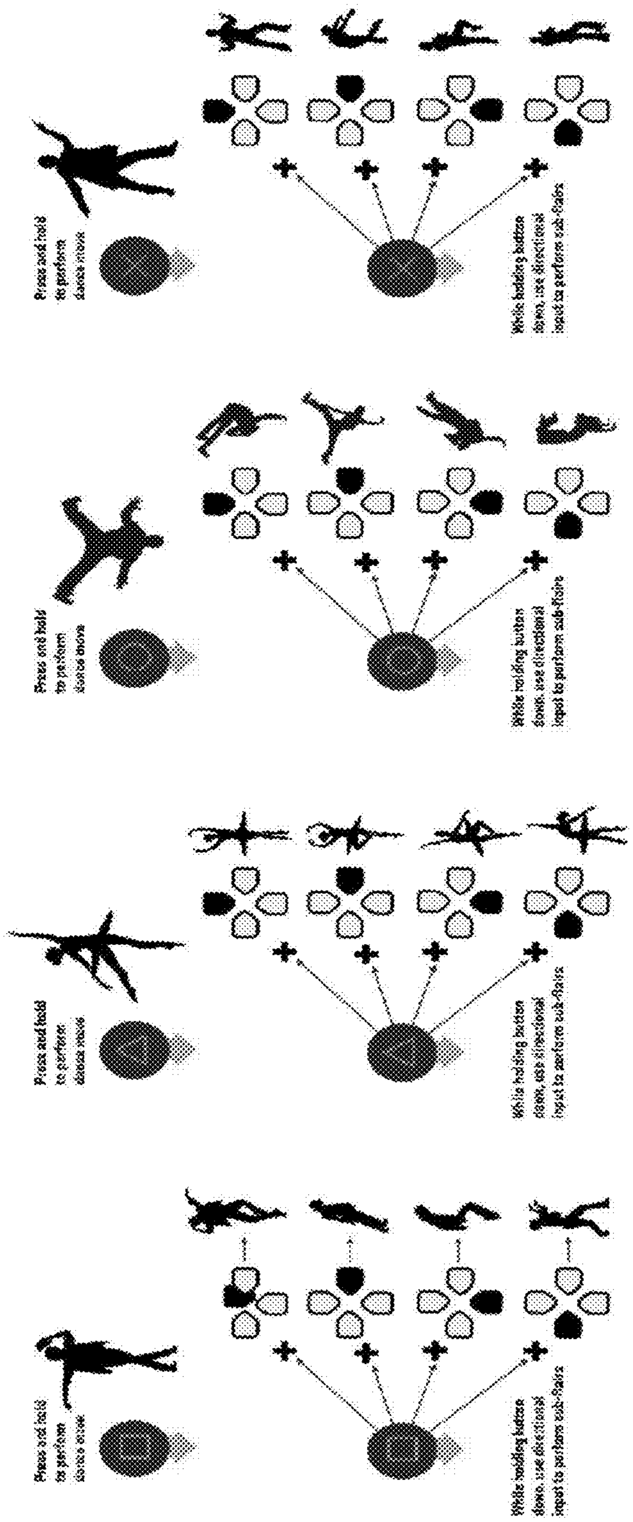
Figure 7:
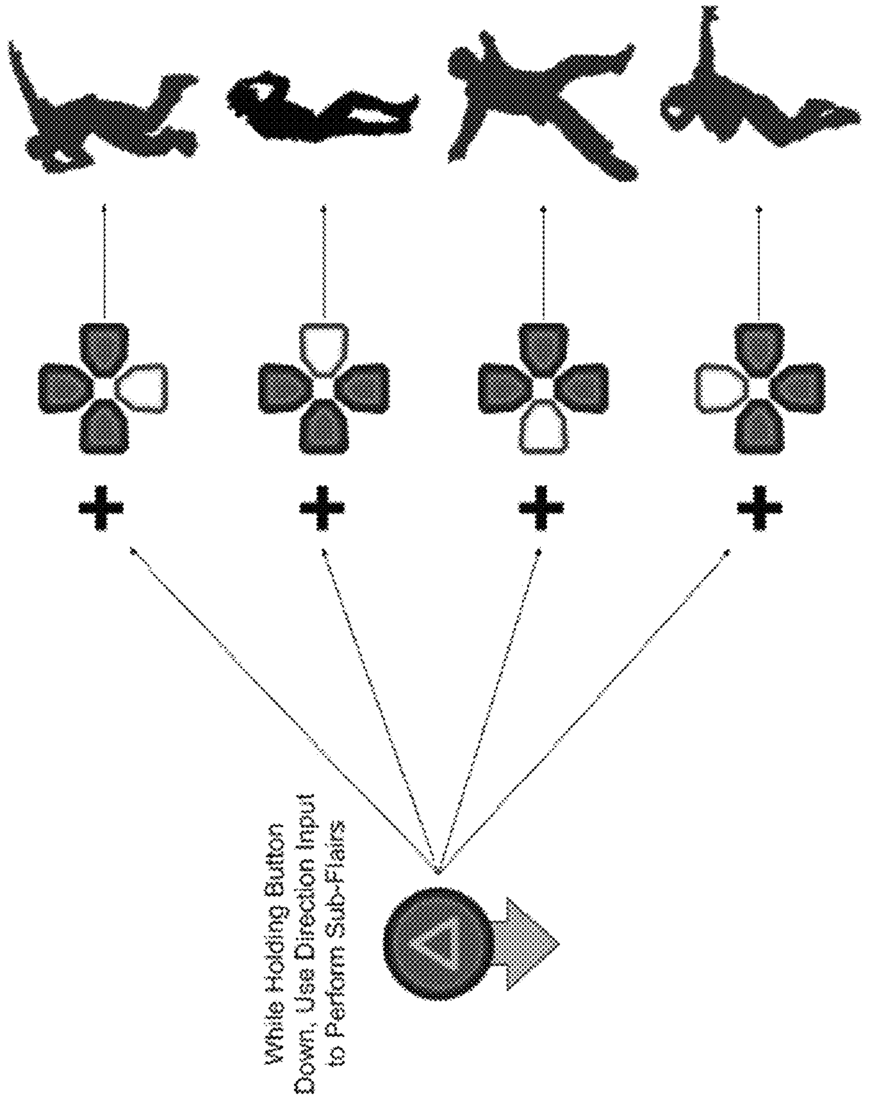
FIG. 7 illustrates an example of how interfacing with one or more control instruments transitions an avatar from a primary series of moves (primary animation card) to one or more secondary series of moves (secondary animation cards), in accordance with one or more embodiments.

As shown in FIG. 6B, the player may interact with four primary buttons (e.g., square, triangle, circle, X) and a number of secondary buttons or user interface components (e.g., directional inputs) to choose from a set of animation cards in a selected animation deck. As such, four separate primary buttons may be assigned to four different animation decks. For example, a first primary button (e.g., the square button) may be assigned to a first animation deck having a first plurality of animation cards associated with a first animation genre (e.g., Thriller dance moves), a second primary button (e.g., the triangle button) may be assigned to a second animation deck having a second plurality of animation cards associated with a second animation genre (e.g., ballet dance moves), and so on. In this embodiment, a player is enabled to select an animation deck by pressing a single button once and move through the animation cards in the animation deck by selecting from a set of secondary buttons to choose from a set of five animation card, where four directional secondary buttons (e.g., up, down, right, left) are mapped to four animation cards, and a neutral state secondary button is mapped to a fifth animation card.

Referring to FIG. 7, in one aspect, after pressing or while holding a primary button, a player may cycle through, for example, five animation cards in the selected animation deck. This allows the player to easily and intuitively move from one animation card in the animation deck to another without having to literally lift a finger and by simply manipulating the directional input to seamlessly switch between the animation cards. In this example, the player can cycle between five animation cards by interacting with a single primary button and four secondary buttons. Assuming a total number of four primary buttons on a controller, the player can easily transition between (4×5) twenty animation cards by interacting with a combination of the four primary buttons and four directional inputs corresponding to five states (neutral, up, down, left, and right), where each state is mapped to an animation card.

It is noteworthy that in at least one example embodiment, after interacting with a primary button (e.g., the triangle button) to select an animation deck, the player may not need to actively interact with a secondary button (e.g., a directional button) in order to select an animation card in the chosen animation deck. In other words, once the animation deck is selected by interacting with a primary button, a default animation card mapped to a first state (e.g., a neutral state) may be automatically considered as selected or being active. In the four examples shown in FIG. 6B, the animation card for the neutral state is shown on top (next to each primary button). The four secondary directional buttons are shown below (next to the directional buttons). In the example of FIG. 7, four animation cards that correspond to selecting the primary triangle button in combination with down, right, left, and up directional buttons are shown. The fifth (e.g., default) animation card corresponding to the neutral state is not shown.

As such, in one embodiment, the animation associated with the default animation card may be used to animate the player's avatar once the player selects the corresponding primary button and the default animation is cycled through in an animated loop until the player interacts with the controller to either (1) move to another animation card in the selected animation deck or (2) select another animation deck. In one embodiment, if the player desires to select another animation card in the animation deck, the player may press one of the secondary buttons. If the player desires to select another animation deck, the player may press one of the primary buttons.

Figure 8:
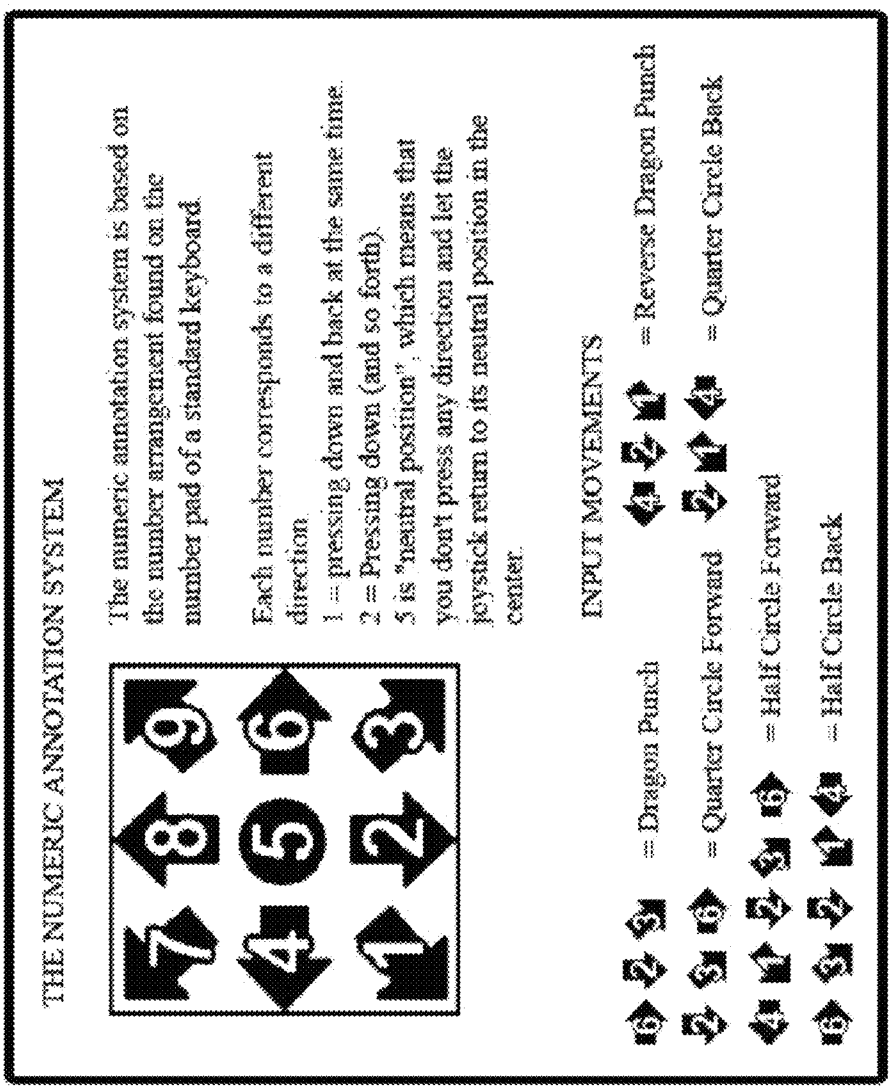
FIG. 8 illustrates an example mapping between certain avatar movements and the corresponding control instruments configured to control transition between different movements, in accordance with one or more embodiments.

Referring in addition to FIG. 8, if the directional interface component (e.g., a joystick, or a series of directional buttons) is configured to recognize one neutral state (e.g., state 5) and 8 directional states (e.g., 1 through 4 and 6 through 9), then the number of selectable animation cards per animation deck (e.g., per primary button) can be increased to nine. Thus, a controller with four primary buttons may be able to select between 36 (4×9) animation cards and therefore control an avatar into performing 36 different animated moves with at most two player inputs corresponding to the selection of (1) a primary input from a total of four primary input components and (2) a secondary input from a total of nine secondary input states. Thus, where a controller provides N primary input components (e.g., N buttons) and M secondary input components (e.g., M directional states), the player can select M×N animation cards using a combination of only two inputs.

Figure 9B:
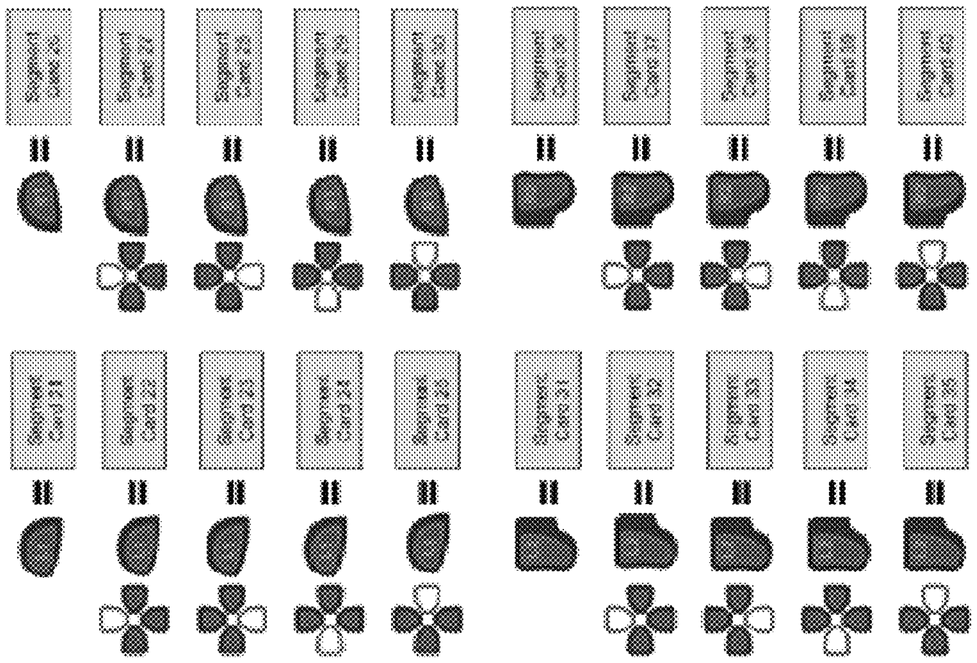
FIGS. 9A and 9B illustrates possible example mappings between certain avatar movements and key combinations of a game controller, in accordance with one or more embodiments.
Figure 9A:
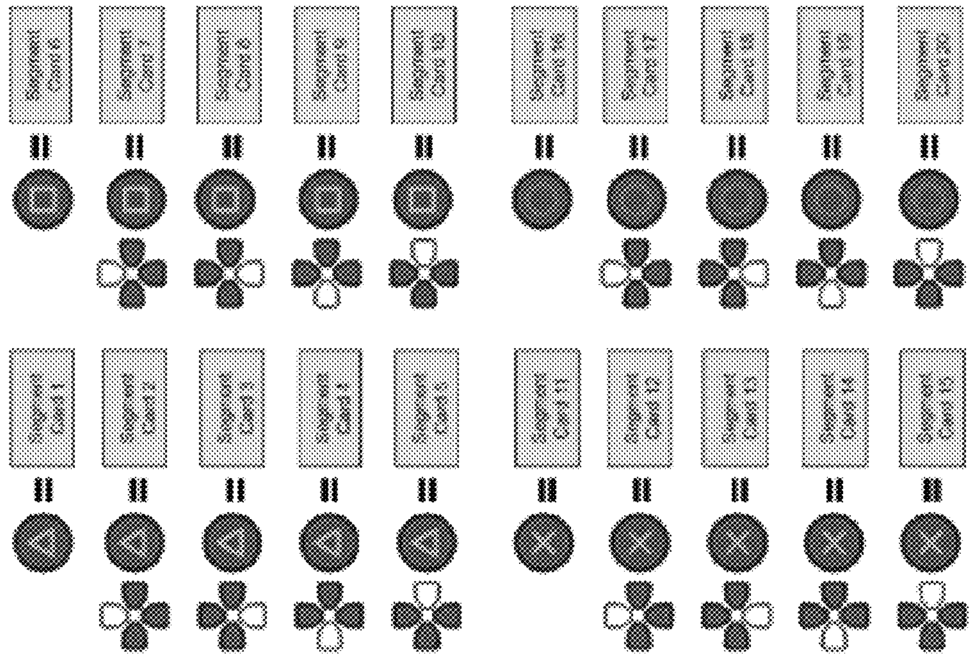
Figure 9E:
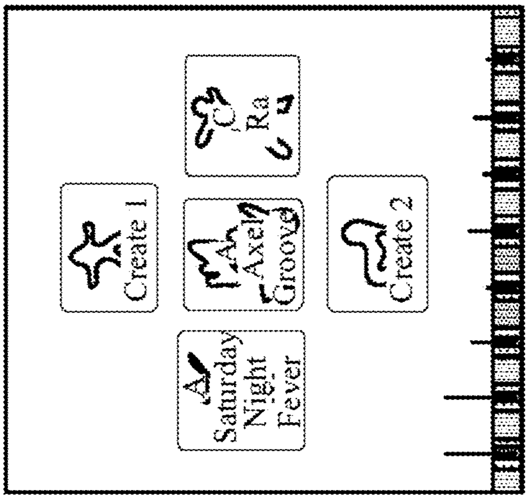
FIGS. 9C, 9D and 9E illustrate possible example graphical user interface controls for switching between multiple animation cards or animation decks, in accordance with one or more embodiments.
Figure 9D:
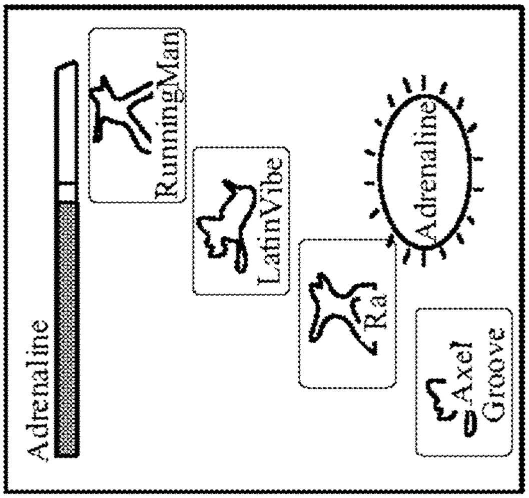
Figure 9C:
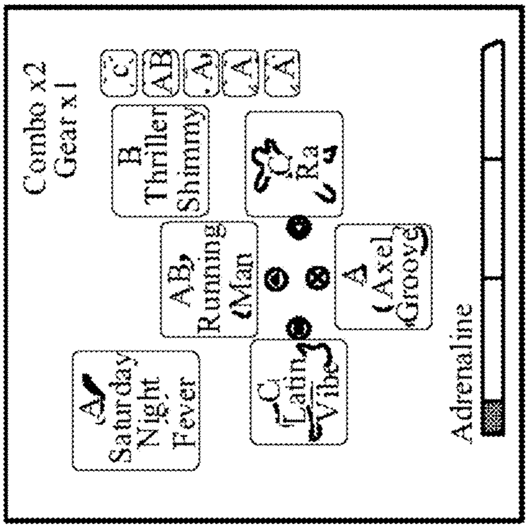

FIGS. 9A and 9B illustrate more specifically how a player may animate an avatar by choosing between multiple animation cards mapped to a plurality of button combinations. In this example, eight controller buttons are mapped to eight animation decks. Each animation deck provides access to one primary animation card and four secondary animation cards by way of the player interacting with a primary controller button and a secondary controller instrument (e.g., a joystick) that has a five-way position factor (Neutral, Up, Down, Left, Right). As shown, a player may simply hold a key combination to which the animation card is assigned and transition between a total of 40 animation cards. The avatar, as displayed on the screen, will begin to perform the segment animation assigned to the selected animation card and loop through that animation until the player releases the key combination or selects another animation card.

As such, by way of interacting with the control instruments on a controller, a player may have access to any of the eight primary animation cards in a single interaction and to any of the 32 corresponding secondary animation cards in at most two interactions. In accordance with certain aspects, transitioning between animation cards in different segments is smooth and without a break due to combining two or more selected moves, from two separate animation cards that are being transitioned, to create a third move that is a combination of, but patently different than, the first two moves. Conventional video game technology fails to accommodate such a feature where distinctly programmed avatar moves are combined together to create a third move that is similar to, yet different from, the two moves being combined.

As provided herein and above, in some implementations, combinations of directional inputs and buttons may be configured to initiate a particular action or move animation. In addition to the button combinations, a player performing a particular sequence of moves or the player interacting with a particular series of buttons may result in the avatar performing a special move. Failure to execute the button combination or the sequence correctly may result in the execution of individual actions or animations assigned to the individual buttons. If the player executes a predetermined programmed sequence (or a sequence created by the player) correctly, then a unique action or animation may be executed and the player may be awarded with higher points for such combination execution.

In certain embodiments, in addition to, or instead of, a series of key combinations or move sequences, a player may be able to create a library of moves that can be performed intuitively without any requirements for the player to memorize a specific key combination or sequence. For example, once the player has obtained a certain number of animation cards, the player may be able to chain selected animation cards together in a preferred order to create one or more custom moves that can be automatically performed back to back by pressing one or just a few buttons. Advantageously, unlike the conventional games which require a sequence of three or more button presses and joystick interactions for performing a high scoring or impressive move, the player may simply customize a small combination of buttons to access a large number of moves from either a default or customized library of animation segments that include custom animation decks made up of animation cards specifically selected by the player.

In certain embodiments, in addition to creating custom animation decks, a player may be able to also create custom animation cards. Each animation card may include a series of micro-moves or micro-segments. A player may be given access to a library of micro-moves, for example, with the option to combine a plurality of the micro-moves to create a macro-move or macro-segment, where a macro-segment is configured into an animation card. In other words, in certain implementations, a player may be able to select a very fine avatar movement referred to herein as a micro-move, where the micro-move defines an atomic move associated with a specific body part (e.g., the avatar's head, hip, shoulder, hand, or foot). Two or more of the micro-moves may be combined to create more complex macro-moves as specifically designed by the player. One or more newly created macro-moves may then be stored as an animation card and saved into an animation card library. Alternatively, the player may be given the option to edit pre-designed macro-moves in an animation card by adding or removing certain micro-moves from an animation card.

Accordingly, in certain embodiments, the player may be able to interact with an animation card editor module to create a modified or completely new animation card with new or different move segments. The editor module may provide a variety of editing features. One feature may allow the player to select one or more animation cards and automatically pick and combine random micro-moves from the selected animation cards to create a new animation card. For example, a player may select a Moonwalk animation card and an animation card including the Floss and ask the editor to randomly mix macro-moves from those two animation cards to create a new animation card. In this manner, it is possible for a player to easily create an infinite number of unique animation cards without substantial effort. As such, a player in addition to playing the game as a contestant may also participate as a creative agent and optionally offer his or her creative work in form of animation cards for sale in a digital market place.

In accordance with certain embodiments, in-game purchases, including the purchase of animation cards or animation decks may be enabled by the virtue of an in-game phantom currency. In certain aspects, a crypto currency may be implemented or adopted to allow players to make transactions both inside and outside the game environment. Certain embodiments may allow a player to upload dances into the game environment by way of, for example, capturing a video or images of an actual performance, where the uploaded video or images may be converted into one or more animation cards for the purpose of use within the game environment. A conversion mechanism may be utilized that scans the uploaded images and video. Using artificial intelligence, the system may determine the best poses or image frames to be captured for the purpose conversion to animation cards. The generated animation cards may be then grouped into one or more animation decks for use or sale.

Figure 10:
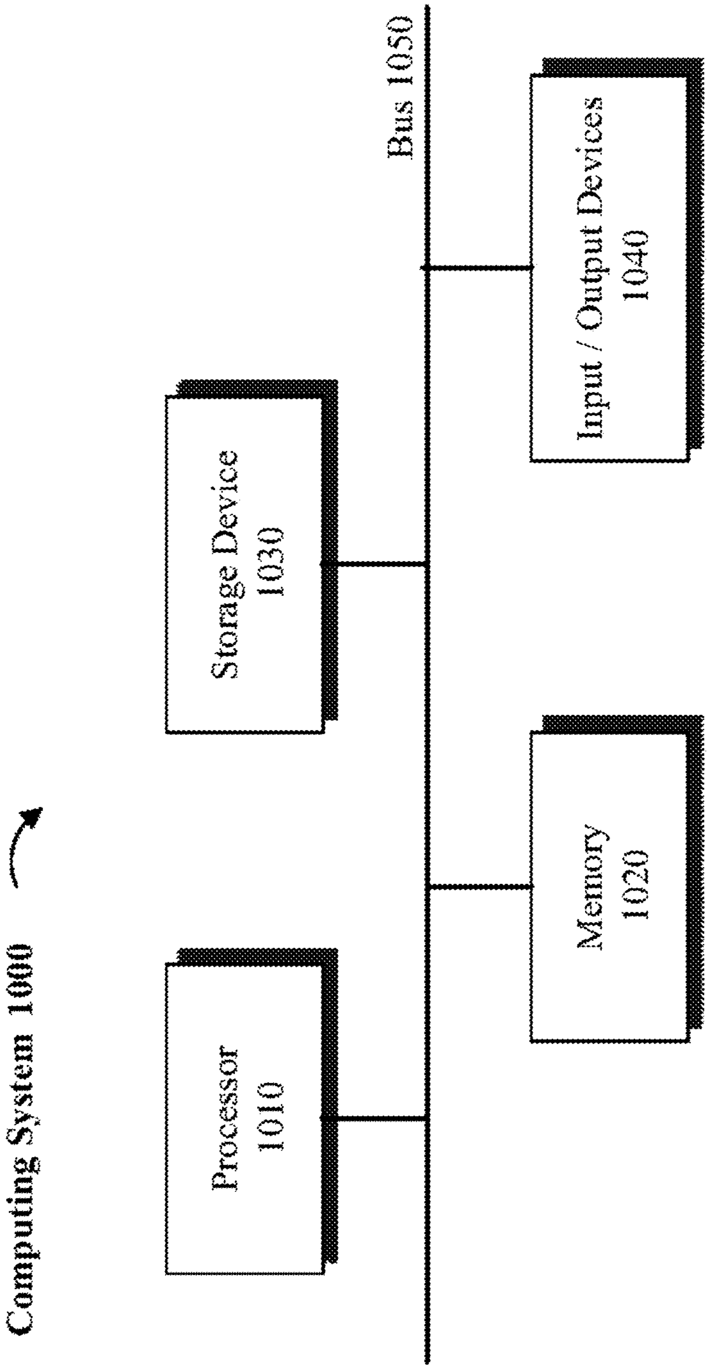
FIG. 10 is a block diagram of an example computing system's hardware components suitable for execution of logic code implemented to support the gaming software and functional features disclosed herein.
Figure 11:
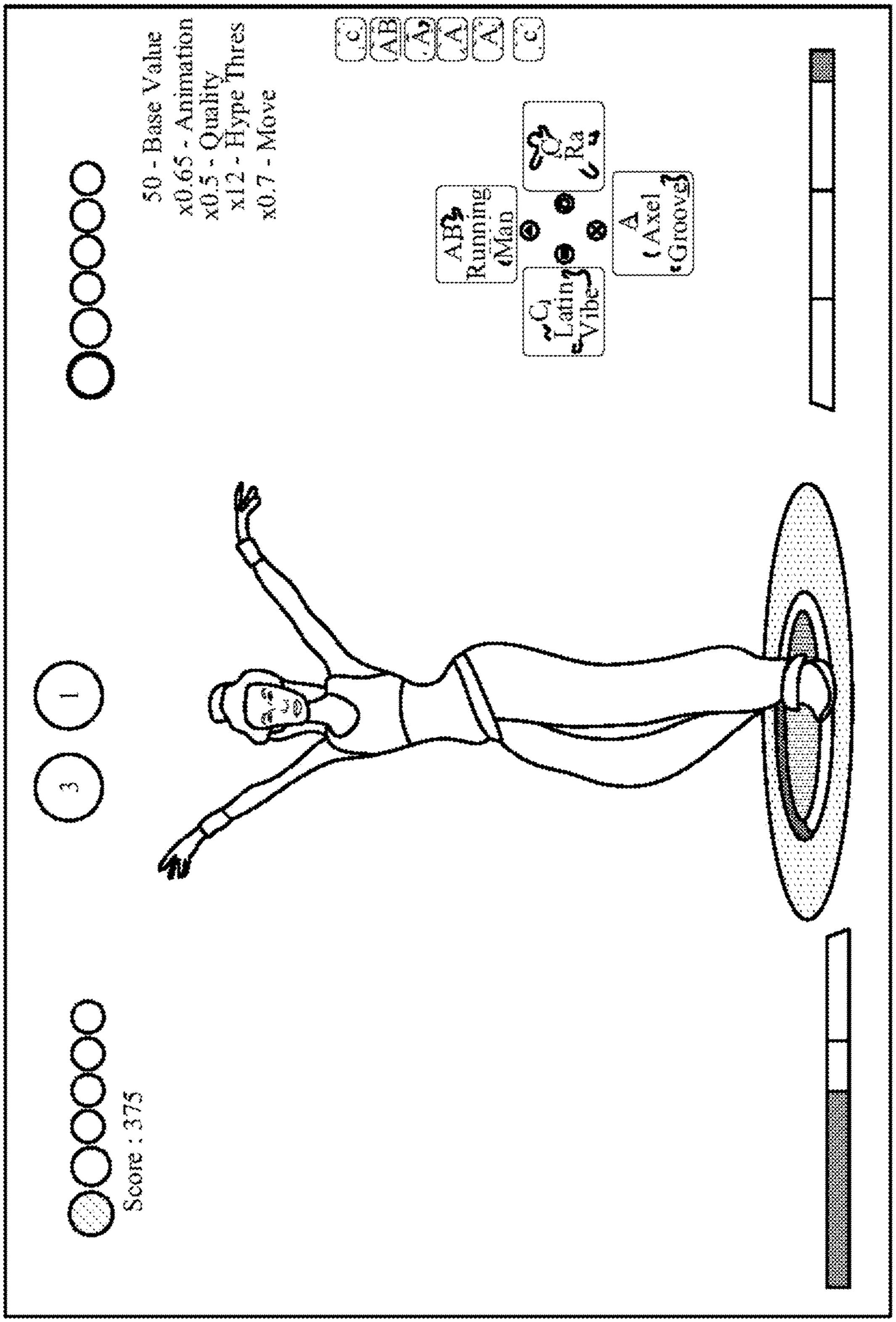
FIGS. 11 through 26 provide examples of graphical user interfaces that may be utilized or adopted in accordance with one or more embodiments to enable a player to interact with, and better understand certain features and aspects of, the game environment as disclosed herein.
Figure 12:
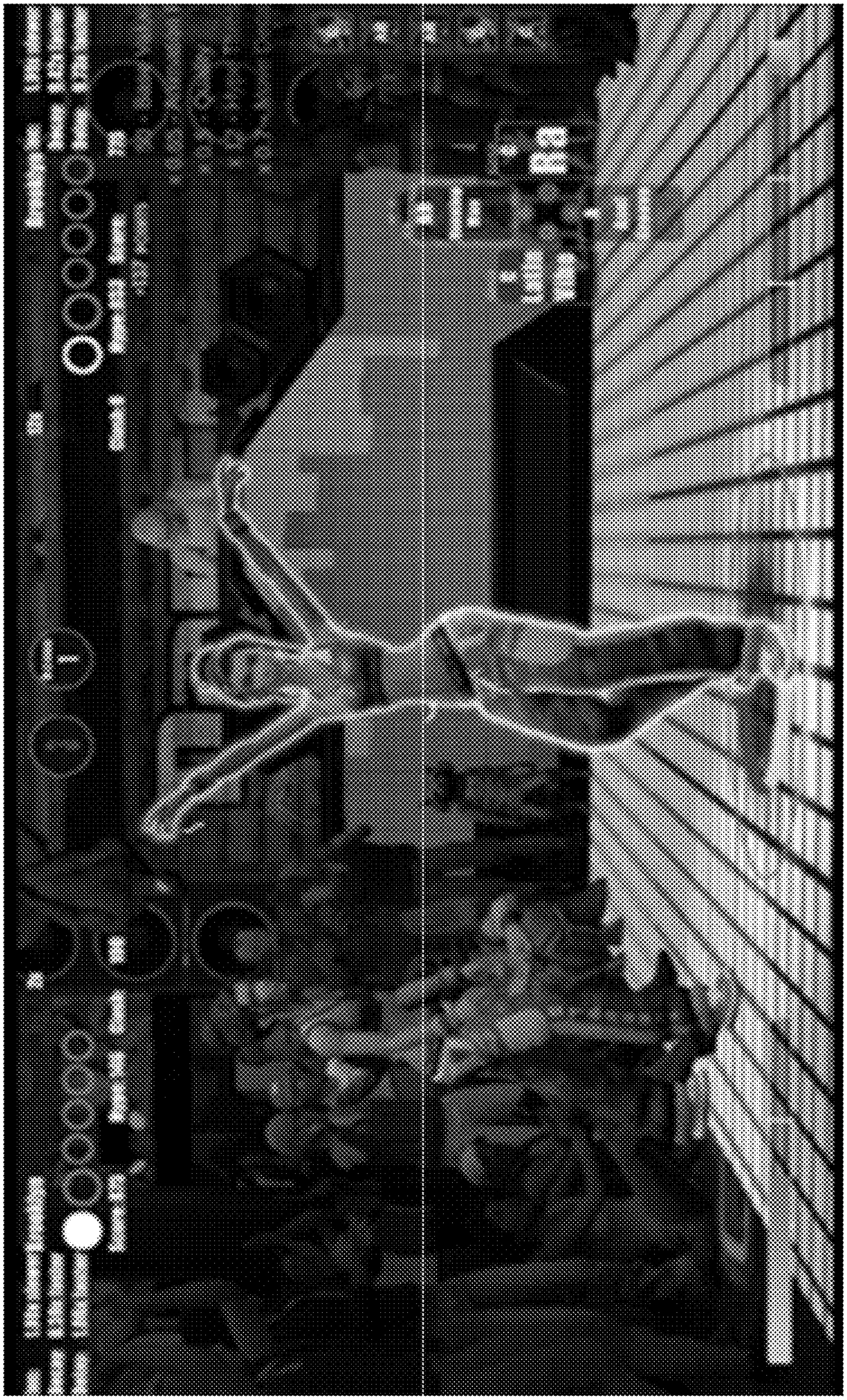
Figure 13:
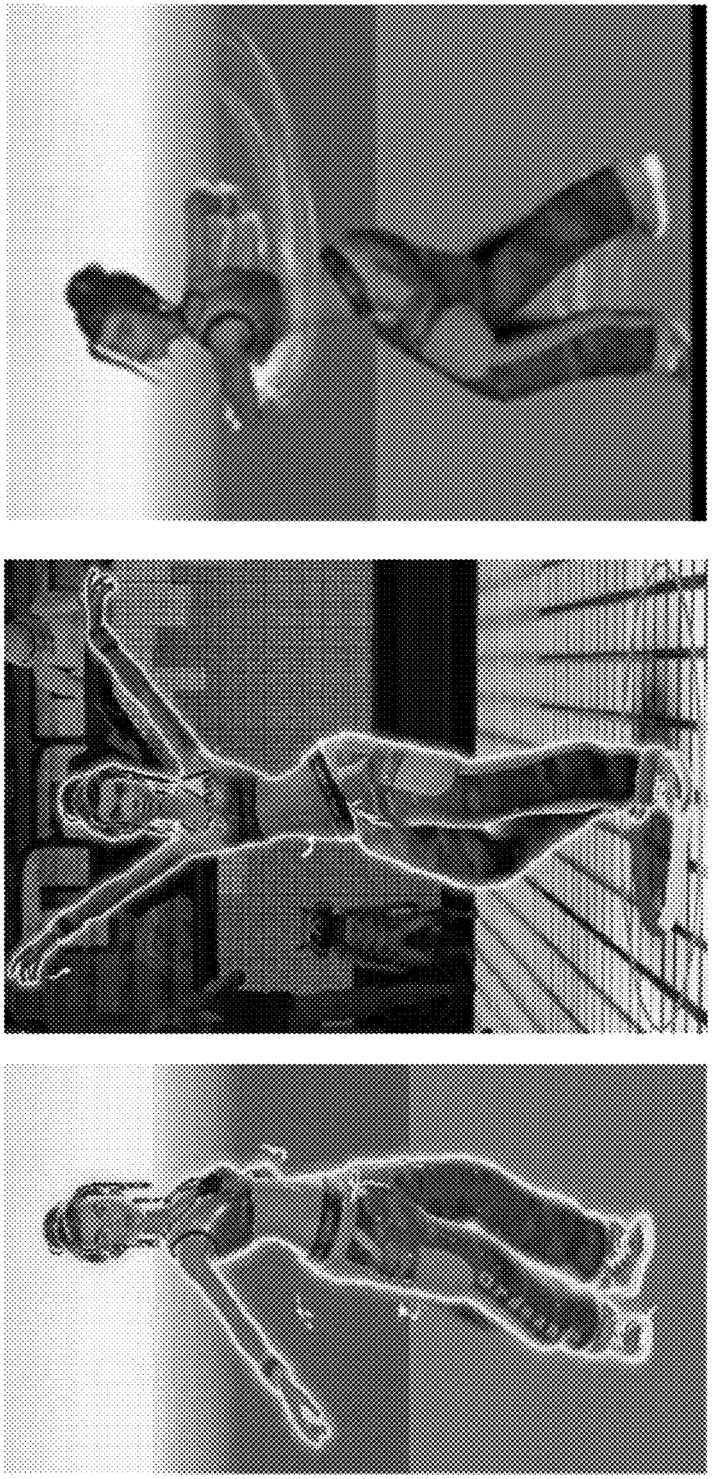
Figure 14:
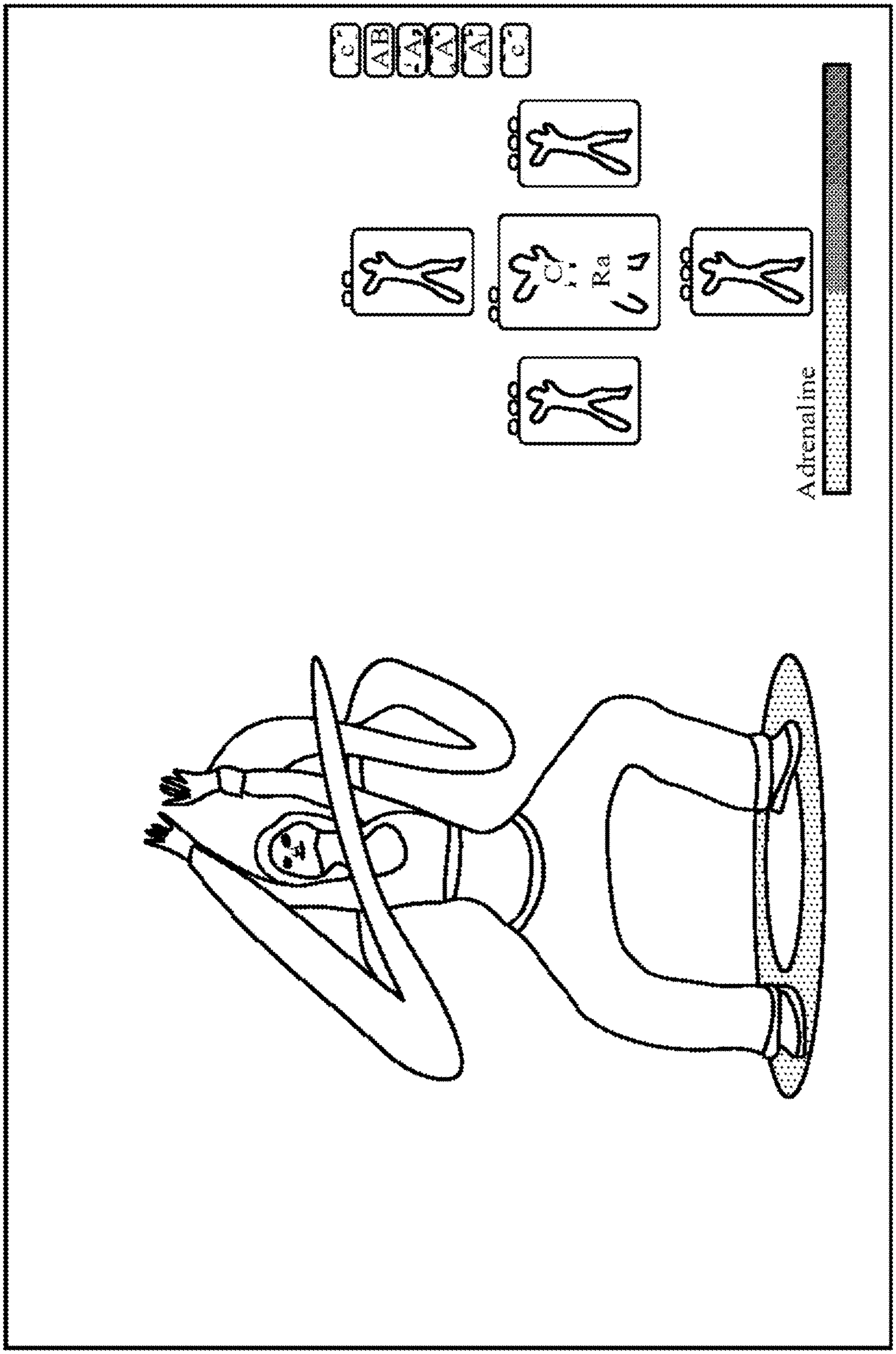
Figure 15:
Figure 16:
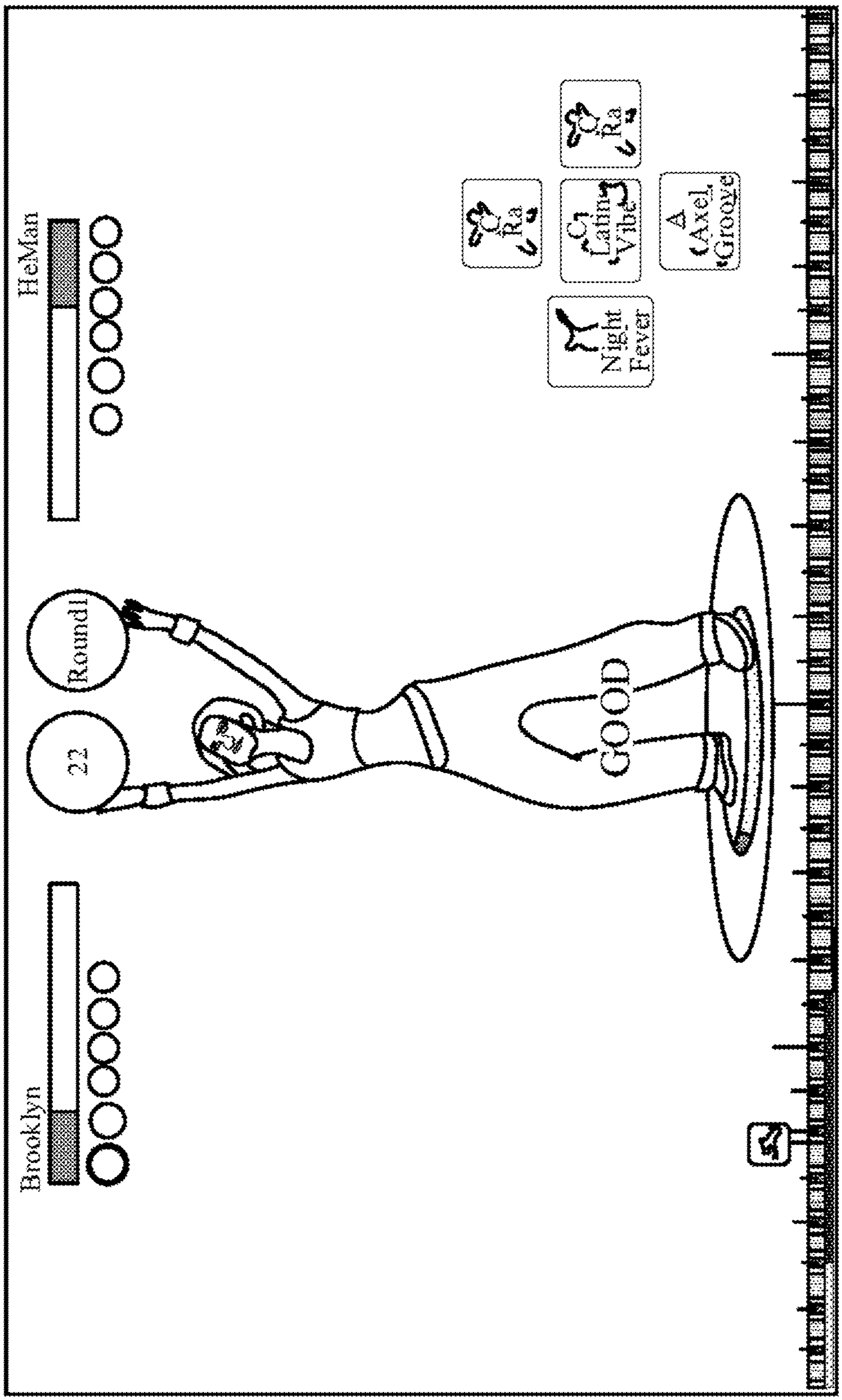
Figure 17:
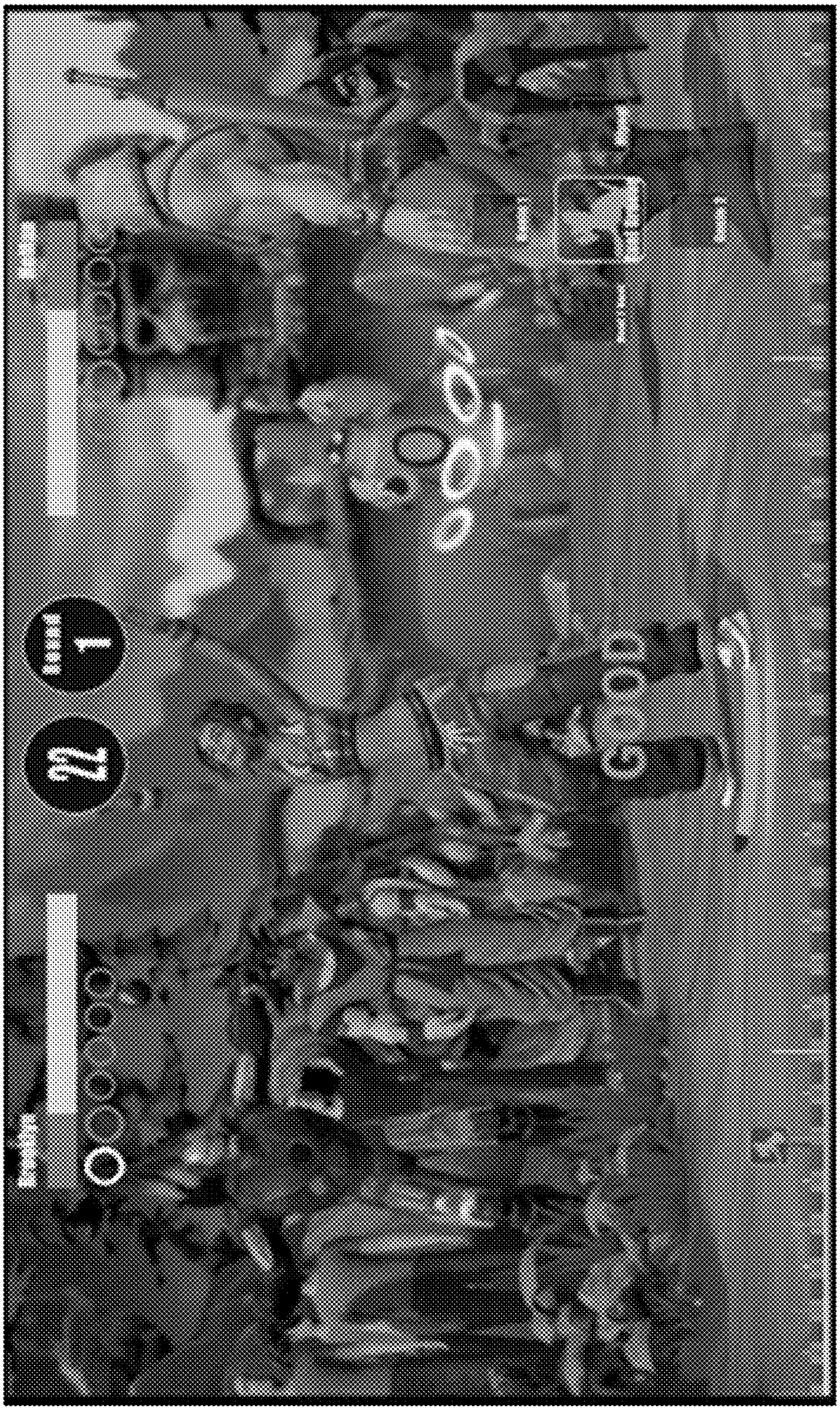
Figure 18:
Figure 19:
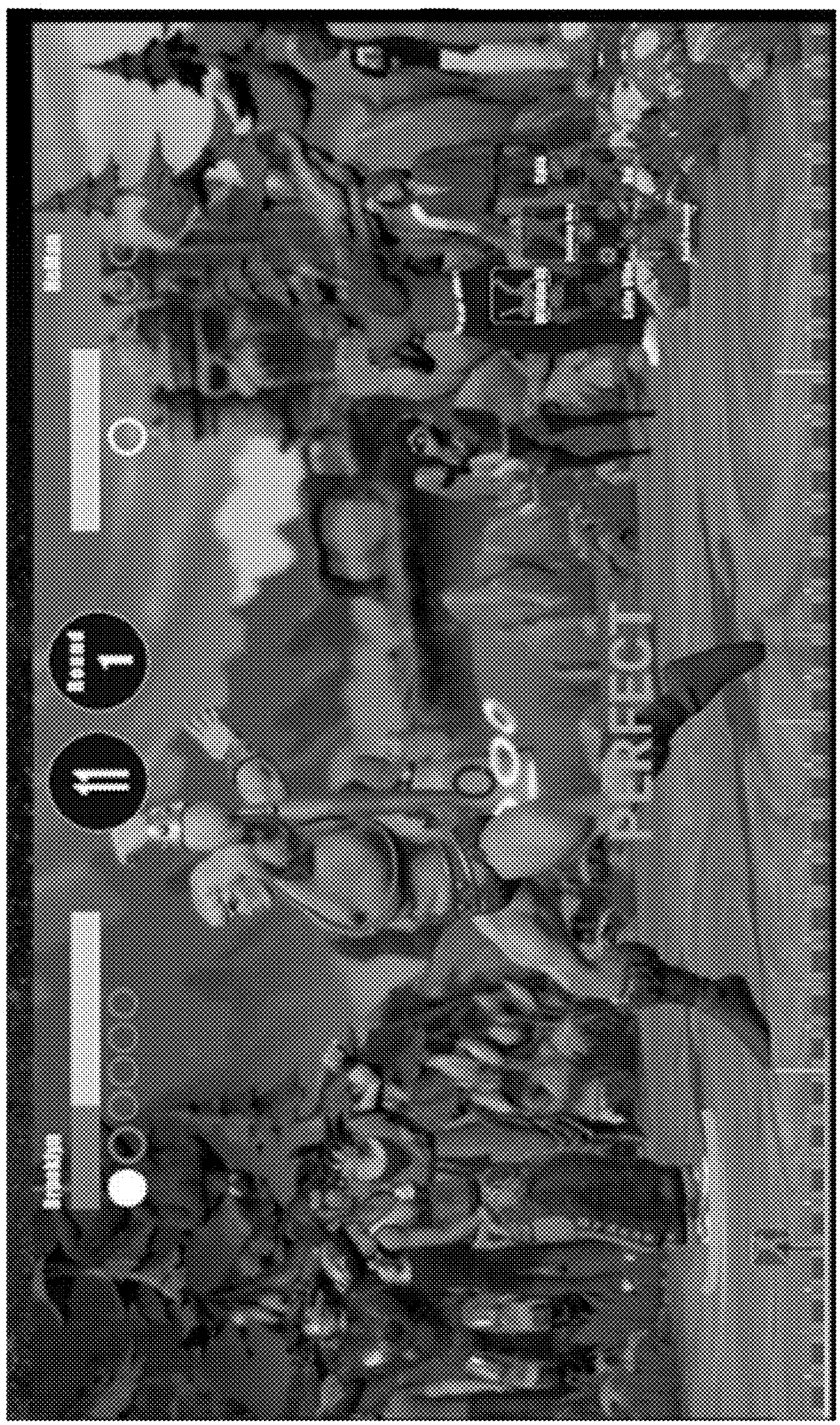
Figure 20:
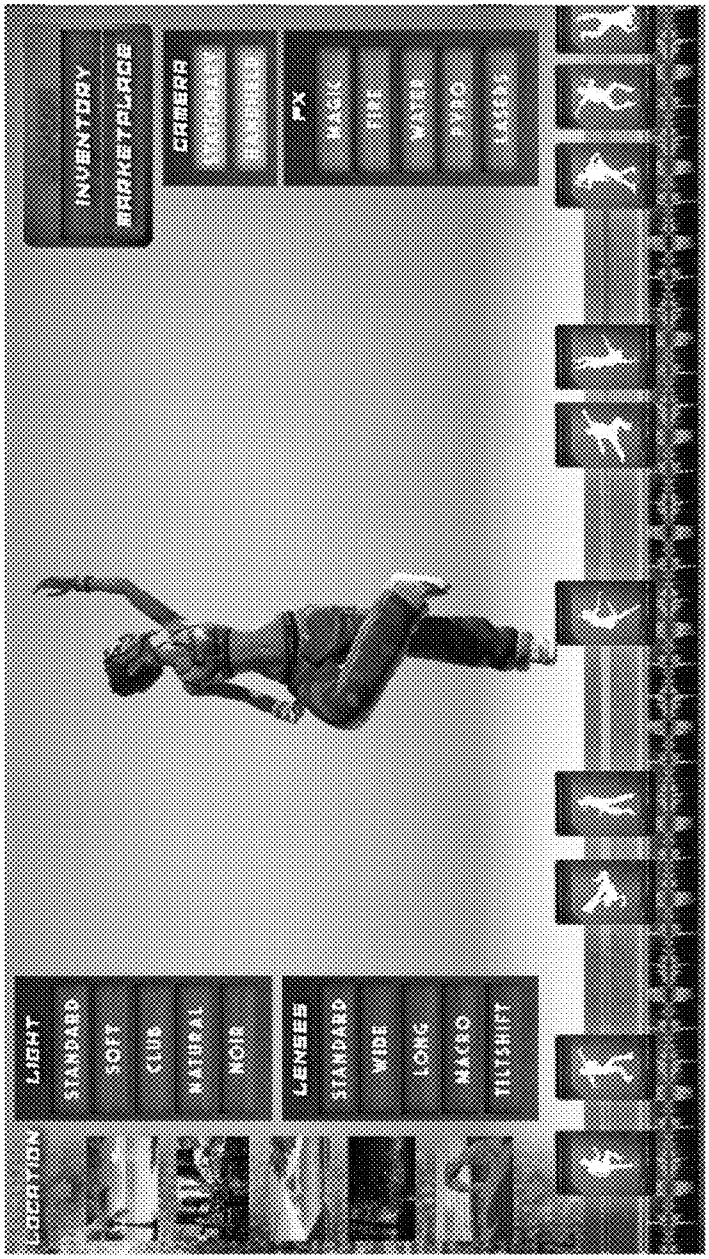
Figure 21:
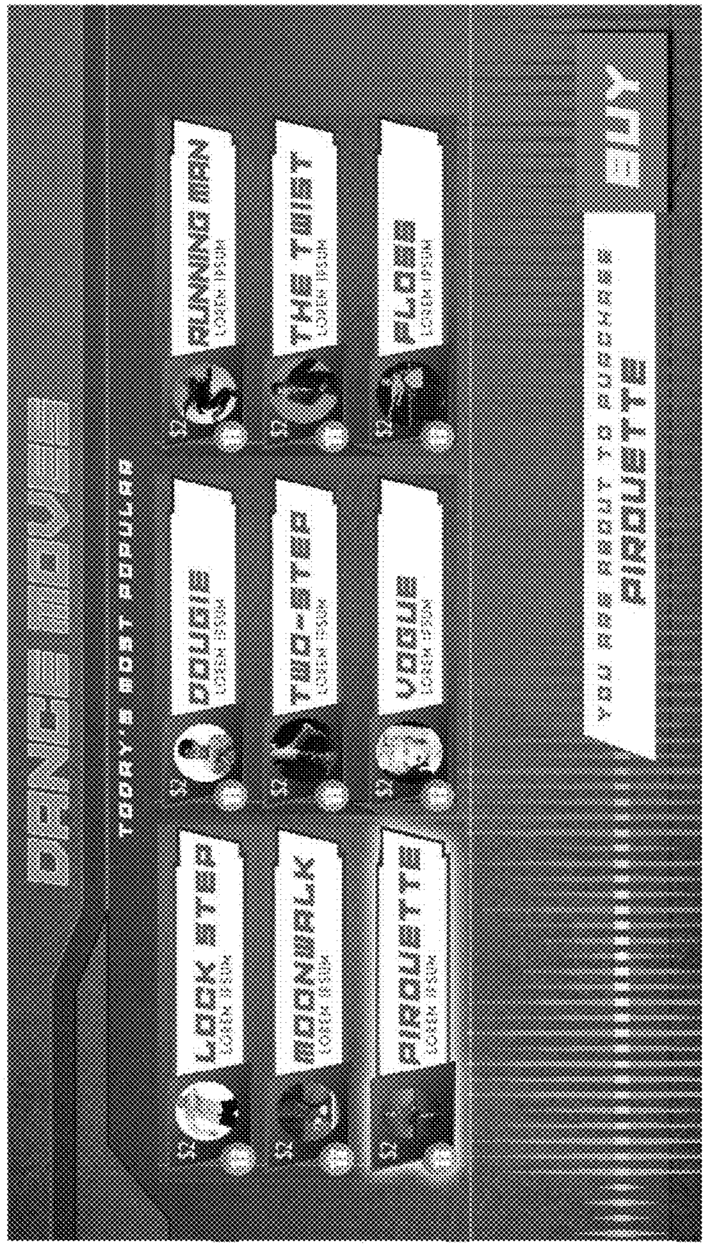
Figure 22:
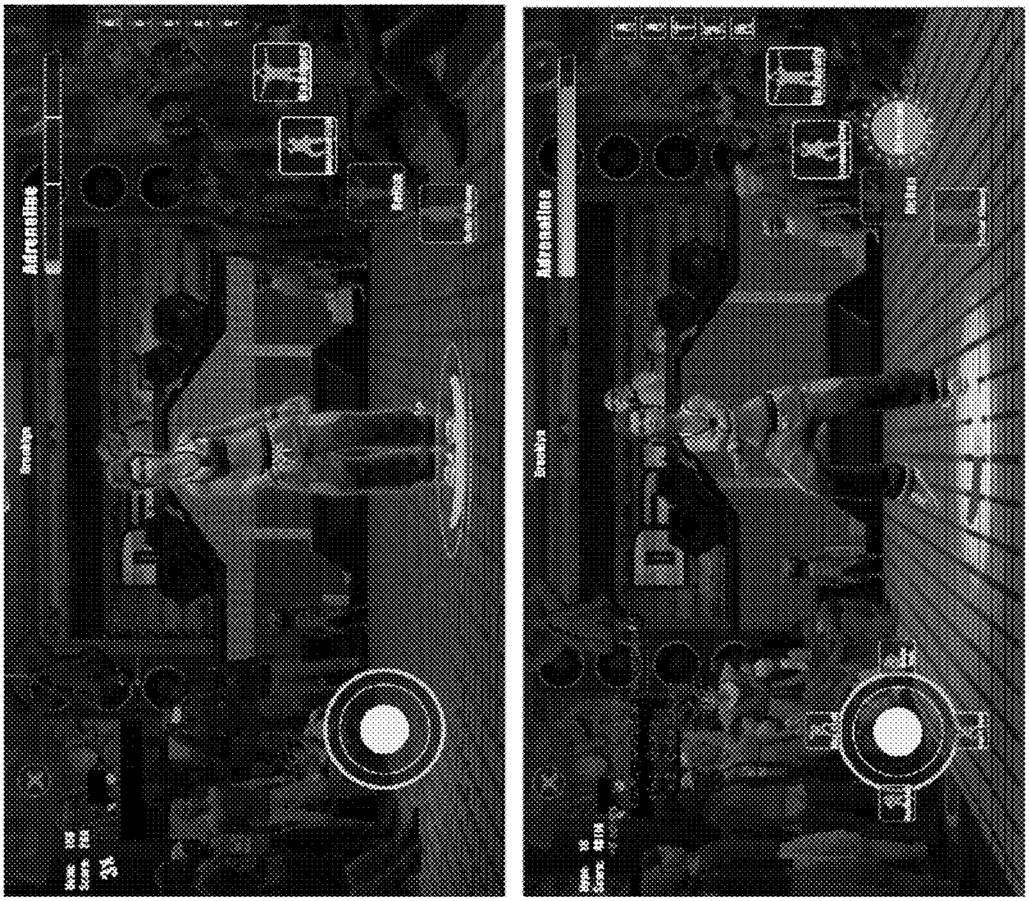
Figure 23:
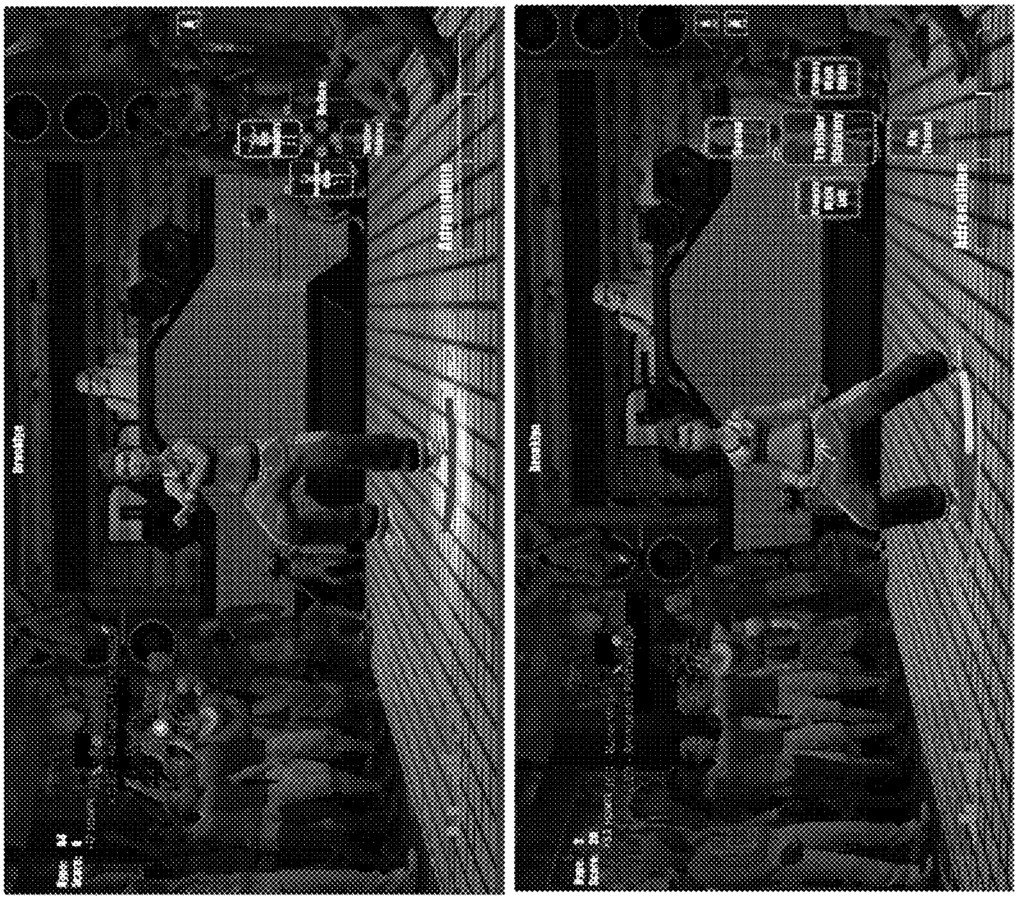
Figure 23:
Figure 24:
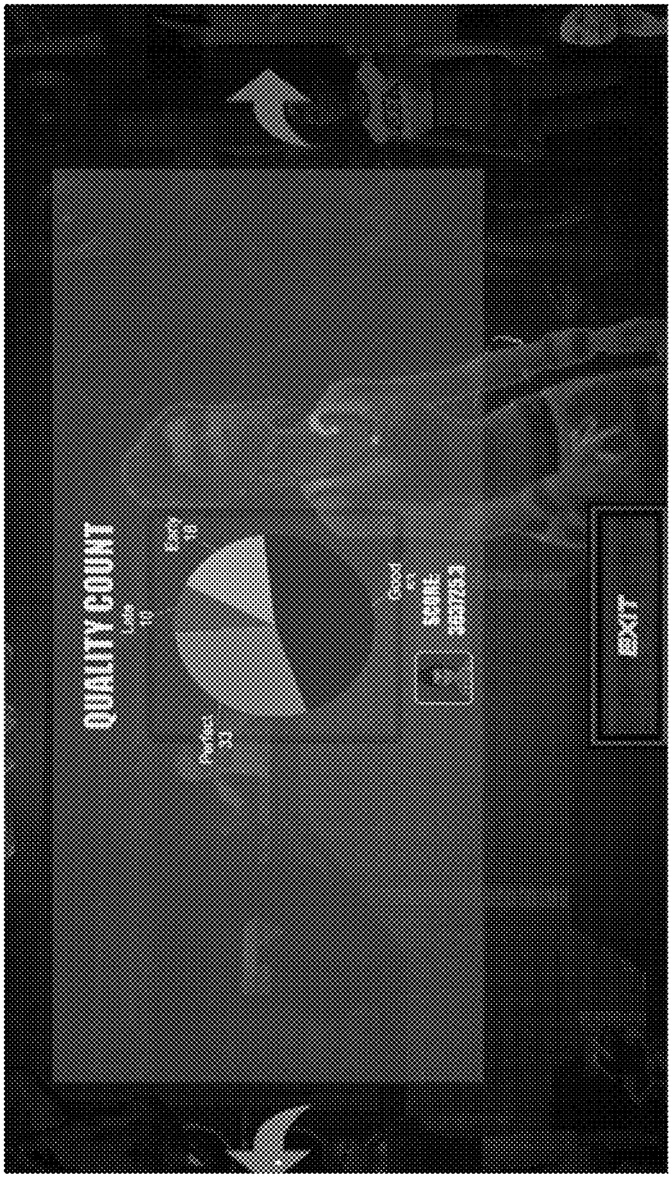
Figure 25:
Figure 26:

Referring to FIG. 10, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 3, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a player by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a player, one or more aspects or features of the subject matter described herein may be implemented on a computer having a display device, such as for example a cathode ray tube (CRT) or a liquid crystal display (LCD) or a light emitting diode (LED) monitor for displaying information to the player and a keyboard and a pointing device, such as for example a mouse or a trackball, by which the player may provide input to the computer. Other kinds of devices may be used to provide for interaction with a player as well. For example, feedback provided to the player may be any form of sensory feedback, such as for example visual feedback, auditory feedback, or tactile feedback; and input from the player may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

FIGS. 11 through 26 provide examples of user interfaces and features, whether functional, structural, or graphical, that may be utilized or adopted in accordance with one or more embodiments to enable a player to interact with and better understand certain features and aspects of the game environment as disclosed herein and above. It is noteworthy that the depiction of various features, figures, backgrounds, and other graphical user interfaces, components or instruments are provided by way of example. These examples are non-limiting in nature and should not be construed as narrowing the scope of the disclosed subject matter to the particular details.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

COPYRIGHT & TRADEMARK NOTICES

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented system for controlling animated renderings via a physical display device, the system comprising one or more processors for executing logic code, the logic code causing the one or more processors to perform operations comprising:

associating M1 animation segments, for animating an avatar, to M1 corresponding animation cards in a first animation deck virtually implemented over a video game platform;

associating M2 animation segments, for animating the avatar, to M2 corresponding animation cards in a second animation deck virtually implemented over the video game platform;

providing N animation decks for selection, the N animation decks comprising the first animation deck and the second animation deck, wherein in response to a first single user interaction with a first primary input element on a controller device, a first animation card in the first animation deck is selected, the first animation card in the first animation deck associated with a first primary animation segment, and the first animation deck comprising one or more secondary animation cards respectively associated with one or more secondary animation segments, the one or more secondary animation segments being directly associated with the first primary animation segment, wherein in response to a second single user interaction with a first secondary input element on the controller device, a second animation card in the first animation deck is selected, the second animation card selected from among the one or more secondary animation cards, and wherein in response to a third single user interaction with a second primary input element on the controller device, a first animation card in the second animation deck is selected, the first animation card in the second animation deck associated with a second primary animation segment different than the first primary animation segment; and transitioning between animation cards in one or more animation decks, wherein the transitioning results in rendering of one or more animation segments associated with selected animation cards as applied to the avatar, such that timing of the transitioning in synchronization with audio being played during the transitioning is a factor in determining a score for the avatar being animated in response to the transitioning.

2. The system of claim 1, wherein the first primary input element is a first user interface button on the controller device and the second primary input element is a second user interface button on the controller device.

3. The system of claim 2, wherein the first user interface button is independently engageable from the second user interface button.

4. The system of claim 1, wherein the secondary input element comprises one or more input elements associated with one or more states.

5. The system of claim 4, wherein the one or more states includes a neutral state associated with the first animation card in the first animation deck.

6. The system of claim 4, wherein the one or more states includes a directional state associated with the second animation card in the first animation deck.

7. The system of claim 1, wherein the secondary input element comprises a plurality of input elements associated with a plurality of states, the plurality of input elements including:

a neutral state input element associated with the first animation card in the first animation deck, and at least one directional state input element associated with the second animation card in the first animation deck.

8. The system of claim 7, wherein the secondary input element is a directional input pad having a plurality of directional input elements and a neutral state input element, the neutral state input element being triggered by default when the first primary input element is active, thereby rendering a first animation segment as applied to the avatar without user interaction with any secondary input element.

9. The system of claim 7, wherein the secondary input element is a directional input pad having a plurality of directional input elements and a neutral state input element, the plurality of directional input elements being assigned to at least one or more of an upward direction, a downward direction, a leftward direction, and a rightward direction respectively, at least one of the plurality of directional input elements being triggered in combination with the first primary input element, for rendering a first animation segment as applied to the avatar, responsive to user interaction with both the first primary input element and at least one secondary input element.

10. The system of claim 1, wherein the animation segments depict one or more segments from a dance routine choreographed based on timed sequences that are synchronizable with a beat or cadence of the audio being played during the transitioning.

11. A computer-implemented game system comprising:

at least one programmable processor; and a non-transitory machine-readable medium storing instructions that, when executed by the at least one programmable processor, cause the at least one programmable processor to perform operations comprising:

associating M1 animation segments, for animating an avatar, to M1 corresponding animation cards in a first animation deck virtually implemented over a video game platform;

associating M2 animation segments, for animating the avatar, to M2 corresponding animation cards in a second animation deck virtually implemented over the video game platform;

providing N animation decks for selection, the N animation decks comprising the first animation deck and the second animation deck, wherein in response to a first single user interaction with a first primary input element on a controller device, a first animation card in the first animation deck is selected, the first animation card in the first animation deck associated with a first primary animation segment, and the first animation deck comprising one or more secondary animation cards respectively associated with one or more secondary animation segments, the one or more secondary animation segments being directly associated with the first primary animation segment, wherein in response to a second single user interaction with a first secondary input element on the controller device, a second animation card in the first animation deck is selected, the second animation card selected from among the one or more secondary animation cards, and wherein in response to a third single user interaction with a second primary input element on the controller device, a first animation card in the second animation deck is selected, the first animation card in the second animation deck associated with a second primary animation segment different than the first primary animation segment; and transitioning between animation cards in one or more animation decks, wherein the transitioning results in rendering of one or more animation segments associated with selected animation cards as applied to the avatar, such that timing of the transitioning in synchronization with audio being played during the transitioning is a factor in determining a score for the avatar being animated in response to the transitioning.

12. The system of claim 11, wherein the first primary input element is a first user interface button on the controller device and the second primary input element is a second user interface button on the controller device and the first user interface button is independently engageable from the second user interface button.

13. The system of claim 11, wherein the secondary input element comprises one or more input elements associated with one or more states, the one or more states includes a neutral state associated with the first animation card in the first animation deck and a directional state associated with the second animation card in the first animation deck.

14. The system of claim 11, wherein the secondary input element comprises a plurality of input elements associated with a plurality of states, the plurality of input elements including at least one of a neutral state input element associated with the first animation card in the first animation deck, and a directional state input element associated with the second animation card in the first animation deck.

15. A computer program product comprising a non-transitory machine-readable medium storing instructions that, when executed by at least one programmable processor, cause the at least one programmable processor to perform operations comprising:

associating five animation segments, for animating an avatar, to five corresponding animation cards in a first animation deck virtually implemented over a video game platform;

associating five animation segments, for animating the avatar, to five corresponding animation cards in a second animation deck virtually implemented over the video game platform;

providing four animation decks for selection, the four animation decks comprising the first animation deck, the second animation deck, a third animation deck, and a fourth animation deck, wherein in response to a first user interaction with a first primary input element, a first animation card in the first animation deck is selected, the first animation card in the first animation deck associated with a first primary animation segment, and the first animation deck comprising one or more secondary animation cards respectively associated with one or more secondary animation segments, the one or more secondary animation segments being directly associated with the first primary animation segment, wherein in response to a second user interaction with a first secondary input element, a second animation card in the first animation deck is selected, the second animation card selected from among the one or more secondary animation cards wherein in response to a third user interaction with a second primary input element, a first animation card in the second animation deck is selected; and in response to a fourth user interaction with the first secondary input element, a second animation card in the second animation deck is selected, and transitioning between animation cards in one or more animation decks, wherein the transitioning results in rendering of one or more animation segments associated with selected animation cards as applied to the avatar.

16. The computer program product of claim 15, such that timing of the transitioning in synchronization with audio being played during the transitioning is a factor in determining a score for the avatar being animated in response to the transitioning.

17. The computer program product of claim 16, wherein the first primary input element is a first user interface button on a controller device and the second primary input element is a second user interface button on the controller device and the first user interface button is independently engageable from the second user interface button.

18. The computer program product of claim 16, wherein the secondary input element comprises a plurality of input elements associated with a plurality of states, the plurality of input elements including at least one of a neutral state input element associated with the first animation card in the first animation deck, and a directional state input element associated with the second animation card in the first animation deck.

* * * * *